US012720405B2

(12) United States Patent
Bartell et al.

(10) Patent No.: US 12,720,405 B2
(45) Date of Patent: Aug. 25, 2026

(54) PATH ROUTING IN A MOBILE NETWORK

(71) Applicant: AT&T Intellectual Property I, L.P., Atlanta, GA (US)

(72) Inventors: John B. Bartell, Milton, GA (US); Zhi Cui, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 910 days.

(21) Appl. No.: 17/957,860

(22) Filed: Sep. 30, 2022

(65) Prior Publication Data

US 2024/0114426 A1 Apr. 4, 2024

(51) Int. Cl.
*H04W 40/20* (2009.01)
*H04W 40/12* (2009.01)
*H04W 40/22* (2009.01)

(52) U.S. Cl.
CPC ........... *H04W 40/20* (2013.01); *H04W 40/12* (2013.01); *H04W 40/22* (2013.01)

(58) Field of Classification Search
CPC ...... H04L 45/12; H04L 45/121; H04W 40/20; H04W 40/12; H04W 40/22
See application file for complete search history.

(56) References Cited

U.S. PATENT DOCUMENTS 9,084,167 B2 7/2015 Park et al.
9,628,252 B2 * 4/2017 Lahetkangas ........ H04B 7/2656
10,028,083 B2 7/2018 Cui et al.

(Continued)

OTHER PUBLICATIONS

"An xApp and an rApp—What's the difference and what do they mean for RAN Automation?", https://accelleran.com/xapp-rapp/, Accessed Aug. 4, 2024, 7 pages.

(Continued)

*Primary Examiner* — Khoa Huynh
(74) *Attorney, Agent, or Firm* — Guntin & Gust, PLC; Louis Yang

(57) ABSTRACT

Aspects of the subject disclosure may include, for example: obtaining first information identifying a first path between a source node located in a network and a destination node located in the network, wherein the first path comprises a first plurality of nodes including at least one first intermediate node between the source node and the destination node, and wherein the first information comprises first latency information that identifies a first travel latency that exists on the first path between the source node and the destination node; obtaining second information identifying a second path between the source node and the destination node, wherein the second path comprises a second plurality of nodes including at least the source node and the destination node, and wherein the second information comprises second latency information that identifies a second travel latency that exists on the second path between the source node and the destination node; and selecting as a selected path either the first path or the second path, the selecting being based upon the first travel latency and the second travel latency, wherein the selecting is such that the selected path is capable of carrying a packet from the source node to the destination node in less time than the one of the first path or the second path that is not selected. Other embodiments are disclosed.

20 Claims, 20 Drawing Sheets

(56) References Cited

U.S. PATENT DOCUMENTS

| | | | |
|---|---|---|---|
| 10,321,376 B2 | 6/2019 | Lakhdhar et al. | |
| 2006/0268906 A1 | 11/2006 | Kneckt | |
| 2008/0159143 A1 | 7/2008 | Nagarajan et al. | |
| 2008/0170510 A1* | 7/2008 | Singh | H04L 45/121 370/254 |
| 2014/0086576 A1* | 3/2014 | Campbell | H04J 14/0269 398/28 |
| 2019/0306068 A1 | 10/2019 | Kiss et al. | |
| 2021/0051513 A1 | 2/2021 | Min et al. | |
| 2021/0250758 A1 | 8/2021 | Sikes et al. | |
| 2021/0281478 A1 | 9/2021 | Patterson et al. | |
| 2022/0022285 A1 | 1/2022 | Dowlatkhah et al. | |
| 2023/0013655 A1 | 1/2023 | Stockert et al. | |
| 2023/0083537 A1 | 3/2023 | Cui et al. | |
| 2024/0171508 A1 | 5/2024 | Cui et al. | |

OTHER PUBLICATIONS

"Open RAN", https://www.ericsson.com/en/openness-innovation/open-ran-explained, Accessed Aug. 4, 2024, 8 pages.

"O-RAN and xApp in the 5G Network", https://hackmd.io/@_ZfqOpYhTCq5xfvPo9Xb8g/BkZPesXt2, last edited Oct. 3, 2023, 7 pages.

"RAN Intelligent Controller (RIC)", https://www.mavenir.com/portfolio/mavscale/ai-analytics/ran-intelligent-controller-ric/, Accessed Aug. 4, 2024, 7 pages.

"RIC, xApps, rApps: A Comprehensive Guide to the Key Players", https://stlpartners.com/articles/network-innovation/ric-xapps-rapps-who-are-the-key-players/, Accessed Aug. 4, 2024, 10 pages.

"What Is a RAN Intelligent Controller (RIC)?", https://www.juniper.net/us/en/research-topics/what-is-ric.html, Accessed Aug. 4, 2024, 8 pages.

"What is an rApp?", https://www.linkedin.com/posts/telecomhall_open-ran-what-is-an-rapp-abinash-kumar-activity-7161388349830660096-b-5R, Accessed Jul. 17, 2024, 18 pages.

Zinin, et al., "Flooding optimizations in link-state routing protocols", Mar. 2001, 12 pages.

"Cloud/Centralized Radio Access Network (C-RAN)", LTE Tutorials, https://www.artizanetworks.com/resources/tutorials/cran.html, On or before Jul. 2021, 3 pp.

"What is Open Shortest Path First (OSPF)?", https://www.metaswitch.com/knowledge-center/reference/what-is-openshortest-path-first-ospf#, accessed Aug. 6, 2022, 1 page.

* cited by examiner

2100

| Network | Weighted Delay | Authority | Next Hop | Cumulative TTL |
|---|---|---|---|---|
| 192.168.1.0 | 60 | 130 | 1 | 30 |
| 192.168.2.0 | 140 | 550 | 3 | -2 |
| 192.168.3.0 | 340 | 340 | 5 | -100 |
| 192.168.4.0 | 30 | 60 | 3 | -30 |
| 192.168.5.0 | 560 | 3200 | 2 | -257 |

Figure 2M:
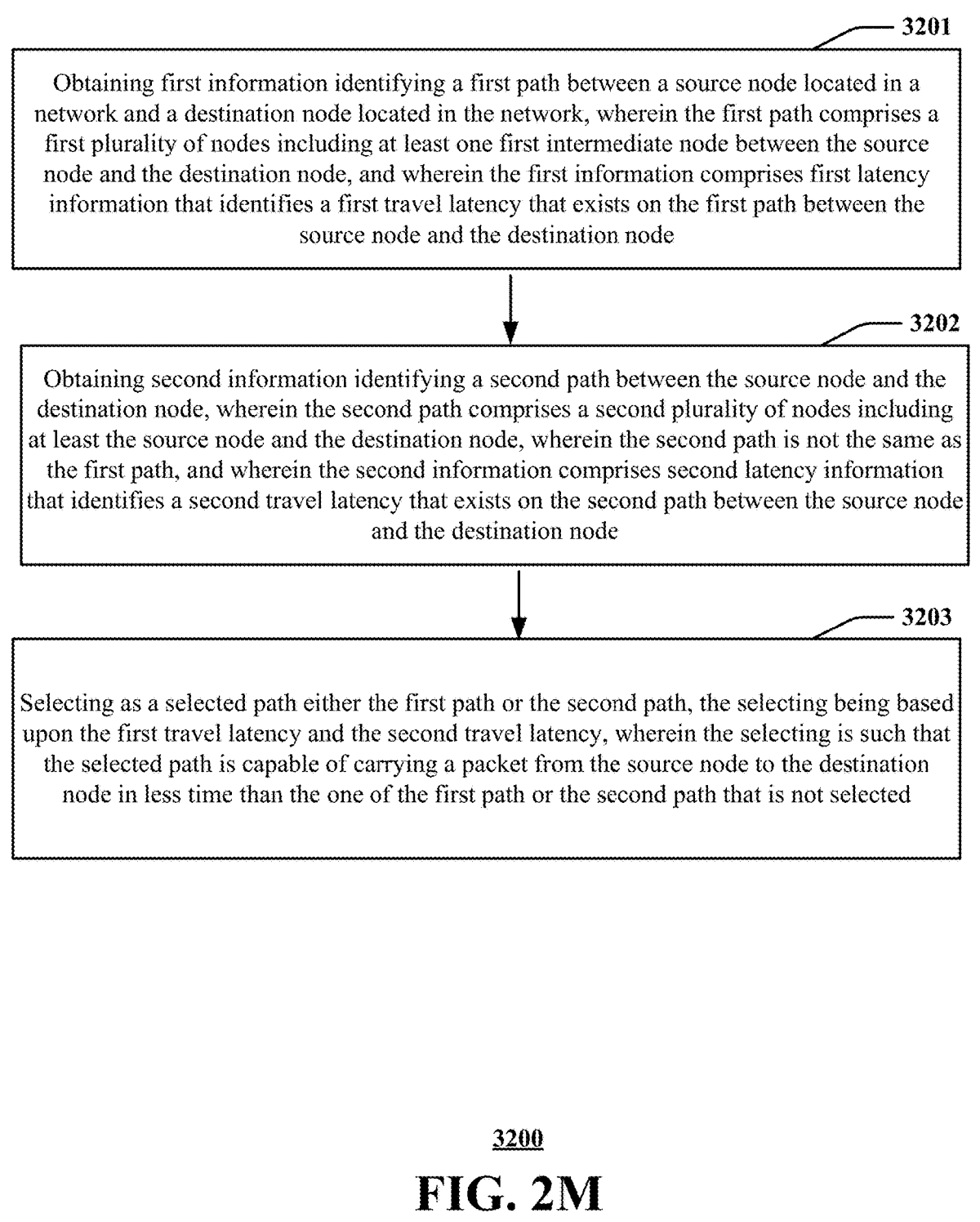

Obtaining first information identifying a first path between a source node located in a network and a destination node located in the network, wherein the first path comprises a first plurality of nodes including at least one first intermediate node between the source node and the destination node, and wherein the first information comprises first latency information that identifies a first travel latency that exists on the first path between the source node and the destination node

3202

Obtaining second information identifying a second path between the source node and the destination node, wherein the second path comprises a second plurality of nodes including at least the source node and the destination node, wherein the second path is not the same as the first path, and wherein the second information comprises second latency information that identifies a second travel latency that exists on the second path between the source node and the destination node

3203

Selecting as a selected path either the first path or the second path, the selecting being based upon the first travel latency and the second travel latency, wherein the selecting is such that the selected path is capable of carrying a packet from the source node to the destination node in less time than the one of the first path or the second path that is not selected

Figure 2N:
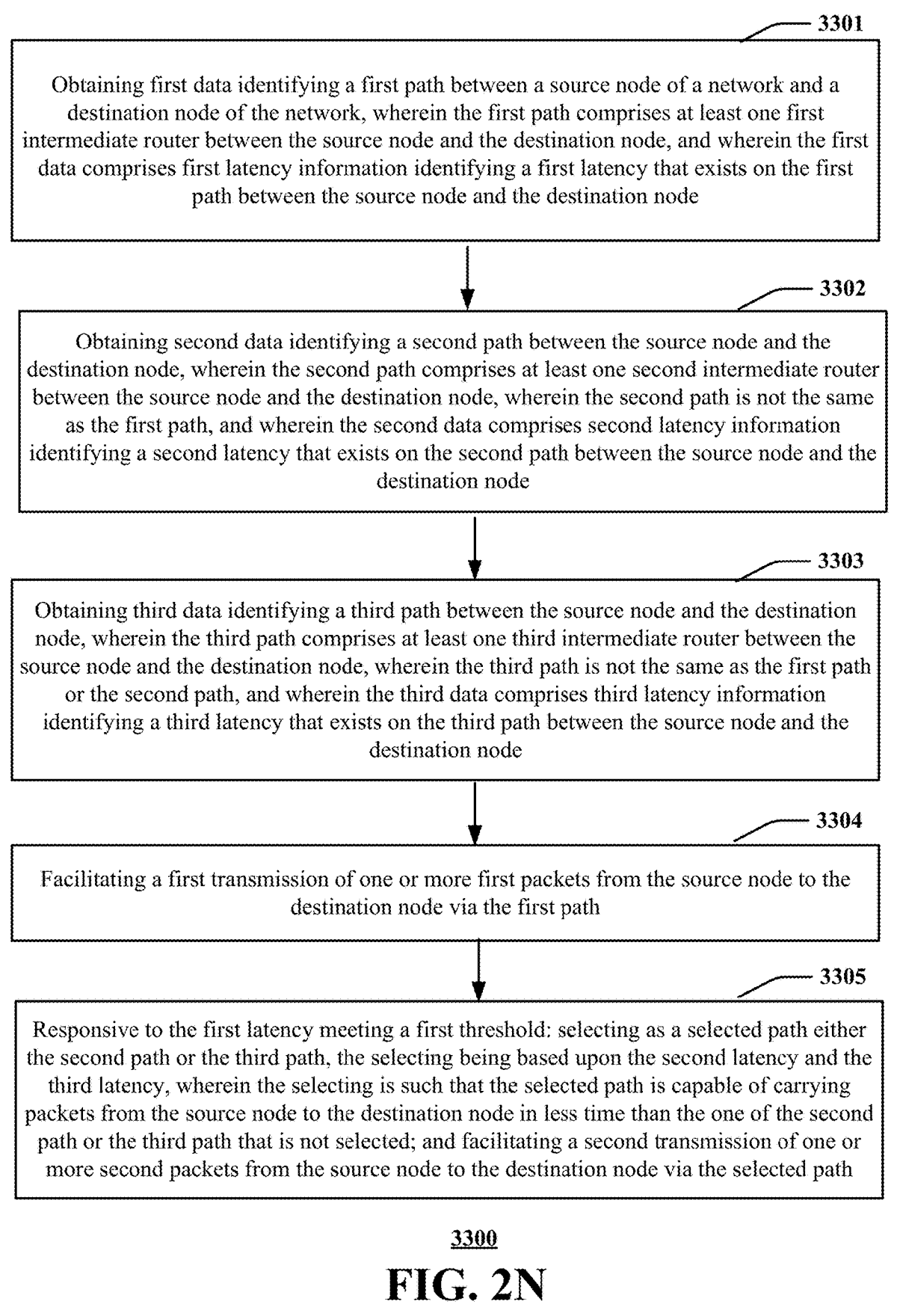

Obtaining first data identifying a first path between a source node of a network and a destination node of the network, wherein the first path comprises at least one first intermediate router between the source node and the destination node, and wherein the first data comprises first latency information identifying a first latency that exists on the first path between the source node and the destination node

3302

Obtaining second data identifying a second path between the source node and the destination node, wherein the second path comprises at least one second intermediate router between the source node and the destination node, wherein the second path is not the same as the first path, and wherein the second data comprises second latency information identifying a second latency that exists on the second path between the source node and the destination node

3303

Obtaining third data identifying a third path between the source node and the destination node, wherein the third path comprises at least one third intermediate router between the source node and the destination node, wherein the third path is not the same as the first path or the second path, and wherein the third data comprises third latency information identifying a third latency that exists on the third path between the source node and the destination node

3304

Facilitating a first transmission of one or more first packets from the source node to the destination node via the first path

3305

Responsive to the first latency meeting a first threshold: selecting as a selected path either the second path or the third path, the selecting being based upon the second latency and the third latency, wherein the selecting is such that the selected path is capable of carrying packets from the source node to the destination node in less time than the one of the second path or the third path that is not selected; and facilitating a second transmission of one or more second packets from the source node to the destination node via the selected path

Figure 2O:
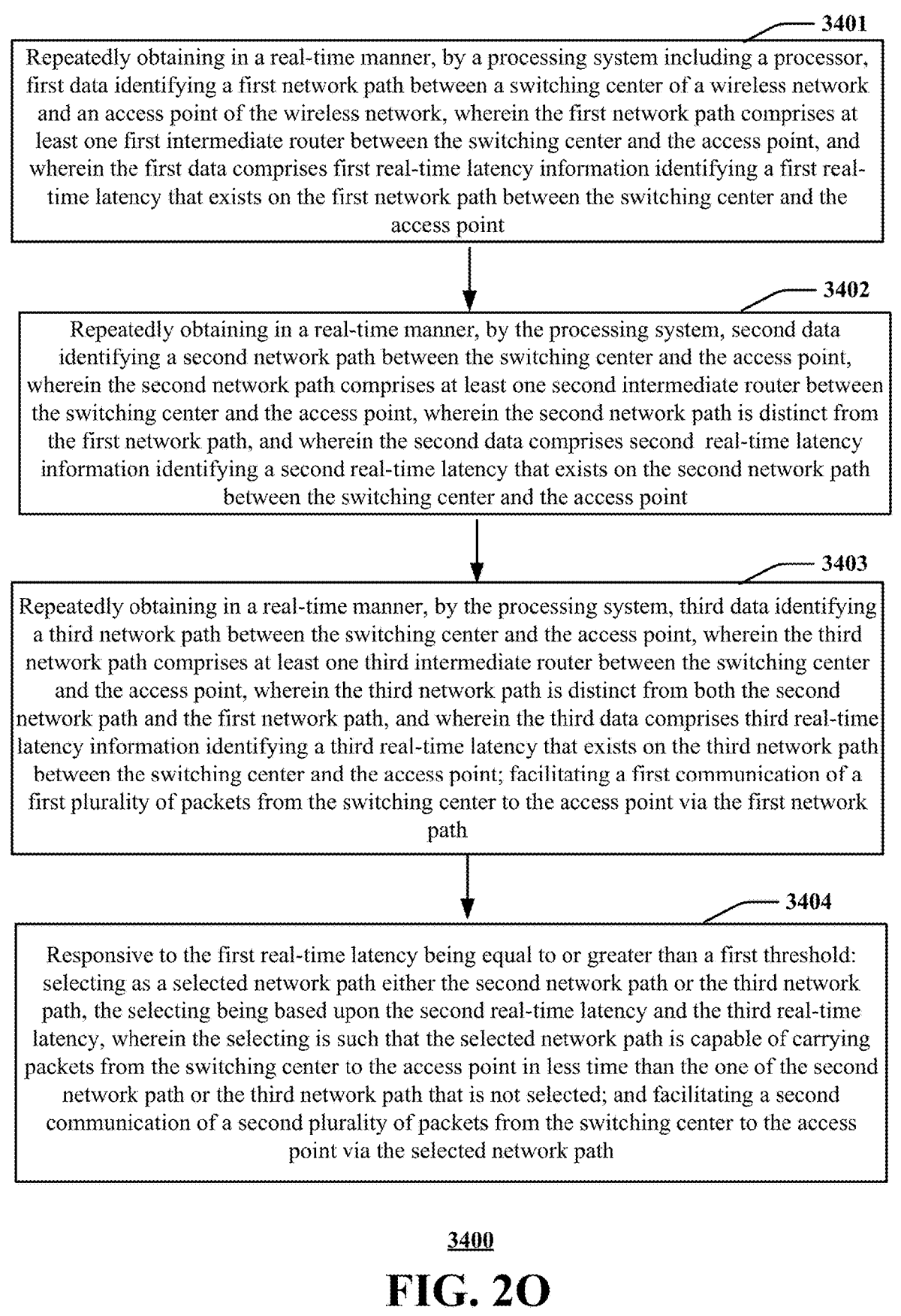

Repeatedly obtaining in a real-time manner, by a processing system including a processor, first data identifying a first network path between a switching center of a wireless network and an access point of the wireless network, wherein the first network path comprises at least one first intermediate router between the switching center and the access point, and wherein the first data comprises first real-time latency information identifying a first real-time latency that exists on the first network path between the switching center and the access point

3402

Repeatedly obtaining in a real-time manner, by the processing system, second data identifying a second network path between the switching center and the access point, wherein the second network path comprises at least one second intermediate router between the switching center and the access point, wherein the second network path is distinct from the first network path, and wherein the second data comprises second real-time latency information identifying a second real-time latency that exists on the second network path between the switching center and the access point

3403

Repeatedly obtaining in a real-time manner, by the processing system, third data identifying a third network path between the switching center and the access point, wherein the third network path comprises at least one third intermediate router between the switching center and the access point, wherein the third network path is distinct from both the second network path and the first network path, and wherein the third data comprises third real-time latency information identifying a third real-time latency that exists on the third network path between the switching center and the access point; facilitating a first communication of a first plurality of packets from the switching center to the access point via the first network path

3404

Responsive to the first real-time latency being equal to or greater than a first threshold: selecting as a selected network path either the second network path or the third network path, the selecting being based upon the second real-time latency and the third real-time latency, wherein the selecting is such that the selected network path is capable of carrying packets from the switching center to the access point in less time than the one of the second network path or the third network path that is not selected; and facilitating a second communication of a second plurality of packets from the switching center to the access point via the selected network path

CLOUD COMPUTING ENVIRONMENTS
375
VIRTUALIZED NETWORK FUNCTION CLOUD
325
VNE
330
VNE
332
VNE
334
TRANSPORT LAYER
350
CONTENT SOURCES
175
MEDIA ACCESS
140
WIRELESS ACCESS
120
VOICE ACCESS
130
BROADBAND ACCESS
110

600

PATH ROUTING IN A MOBILE NETWORK

FIELD OF THE DISCLOSURE

The subject disclosure relates to path routing in a mobile network.

BACKGROUND

Conventional routing protocols typically are static with regards to congestion and typically are not able to efficiently distribute traffic among alternate paths to a destination. This often results in having to install additional capacity to serve a heavily loaded path when there are alternate (perhaps longer in distance and/or hops) paths that could carry the traffic. This often increases costs in mobility network bandwidth (e.g., backhaul bandwidth) and equipment.

Certain conventional routing protocols utilize static parameters to determine the shortest path (such as in terms of distance and/or hops) but the shortest path determined in such conventional manner is not necessarily the least congested nor necessarily has the lowest delay.

Certain conventional routing protocols utilize link state routing (such as in terms of a given link becoming unusable) but the determination of an unusable link in such conventional manner does not necessarily find another path that is the least congested nor necessarily has the lowest delay.

Certain conventional routing protocols do not use congestion in any way to determine traffic paths.

BRIEF DESCRIPTION OF THE DRAWINGS

Reference will now be made to the accompanying drawings, which are not necessarily drawn to scale, and wherein:

FIG. 2D is a block diagram illustrating an example, non-limiting embodiment of a route table (which can function fully or partially within the communication network of FIG. 1) in accordance with various aspects described herein.

FIG. 2M depicts an illustrative embodiment of a method in accordance with various aspects described herein.

FIG. 2N depicts an illustrative embodiment of a method in accordance with various aspects described herein.

FIG. 2O depicts an illustrative embodiment of a method in accordance with various aspects described herein.

DETAILED DESCRIPTION

Figure 1:
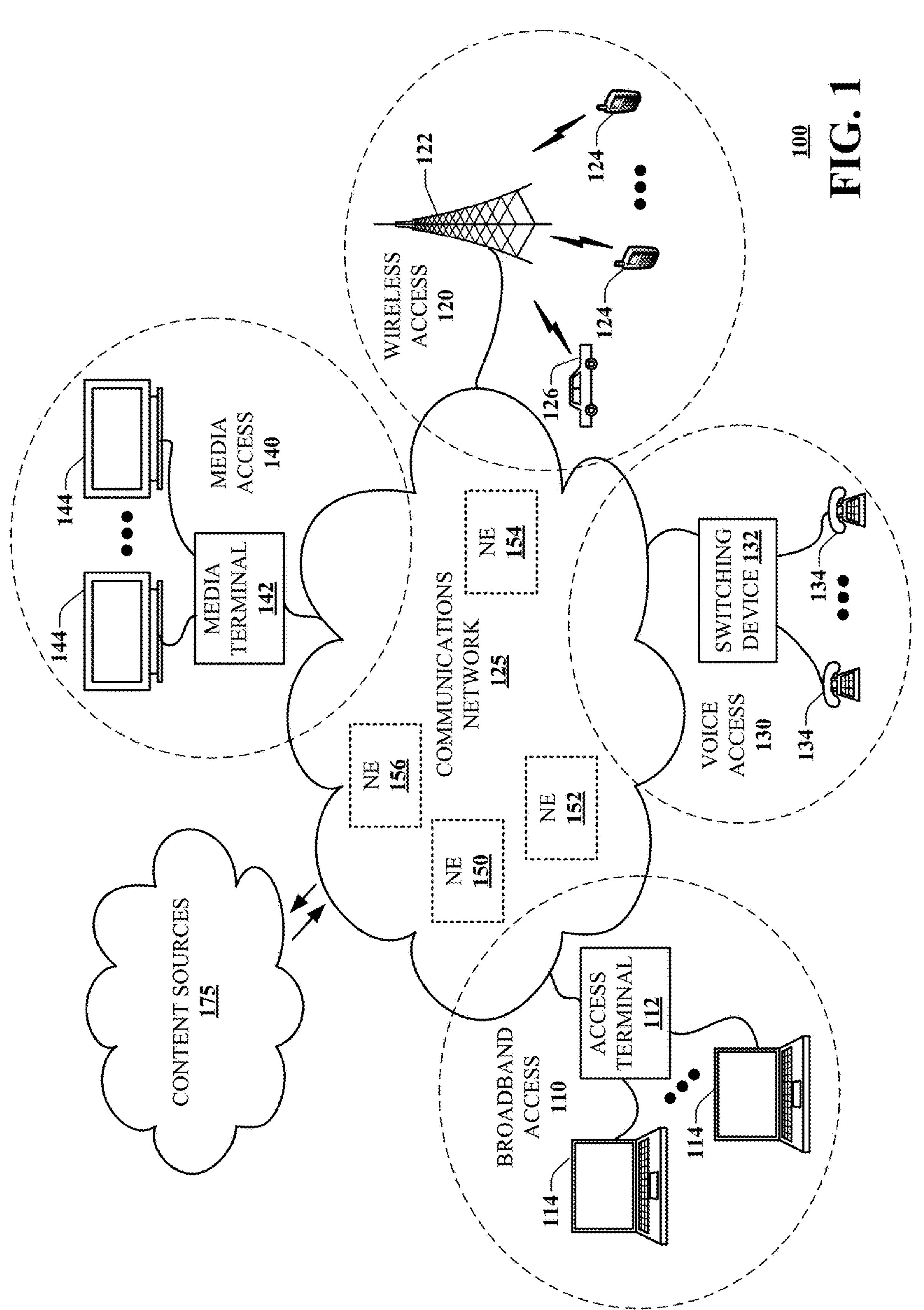
FIG. 1 is a block diagram illustrating an example, non-limiting embodiment of a communication network in accordance with various aspects described herein.

The subject disclosure describes, among other things, illustrative embodiments for path routing in a mobile network (e.g., in a 5G/6G mobile network). In one embodiment, the path routing is a lowest latency non-shortest path routing. Other embodiments are described in the subject disclosure.

As described herein, various embodiments provide for a Relativistic Routing Protocol (sometimes referred to herein as RRP) that routes packets based on latency (e.g., based exclusively on latency), using the lowest instantaneous latency path for each packet in an IP network (such as, for example, those used for 5G/6G networks/backhaul). This RRP enables efficient spreading of traffic among multiple paths to a destination. In one or more embodiments, by always routing packets to the lowest latency path, RRP uses all available alternate path(s) to a destination—leveraging those paths with less congestion (even though, for example, such alternate path(s) may be longer in number of hops and/or distance).

One or more aspects of the subject disclosure include a device, comprising: a processing system including a processor; and a memory that stores executable instructions that, when executed by the processing system, facilitate performance of operations, the operations comprising: obtaining first information identifying a first path between a source node located in a network and a destination node located in the network, wherein the first path comprises a first plurality of nodes including at least one first intermediate node between the source node and the destination node, and wherein the first information comprises first latency information that identifies a first travel latency that exists on the first path between the source node and the destination node; obtaining second information identifying a second path between the source node and the destination node, wherein the second path comprises a second plurality of nodes including at least the source node and the destination node, wherein the second path is not the same as the first path, and wherein the second information comprises second latency information that identifies a second travel latency that exists on the second path between the source node and the destination node; and selecting as a selected path either the first path or the second path, the selecting being based upon the first travel latency and the second travel latency, wherein the selecting is such that the selected path is capable of carrying a packet from the source node to the destination node in less time than the one of the first path or the second path that is not selected.

One or more aspects of the subject disclosure include a non-transitory machine-readable medium comprising executable instructions that, when executed by a processing system including a processor, facilitate performance of operations, the operations comprising: obtaining first data identifying a first path between a source node of a network and a destination node of the network, wherein the first path comprises at least one first intermediate router between the source node and the destination node, and wherein the first data comprises first latency information identifying a first latency that exists on the first path between the source node and the destination node; obtaining second data identifying a second path between the source node and the destination node, wherein the second path comprises at least one second intermediate router between the source node and the destination node, wherein the second path is not the same as the first path, and wherein the second data comprises second latency information identifying a second latency that exists on the second path between the source node and the destination node; obtaining third data identifying a third path between the source node and the destination node, wherein the third path comprises at least one third intermediate router between the source node and the destination node, wherein the third path is not the same as the first path or the second path, and wherein the third data comprises third latency information identifying a third latency that exists on the third path between the source node and the destination node; facilitating a first transmission of one or more first packets from the source node to the destination node via the first path; and responsive to the first latency meeting a first threshold: selecting as a selected path either the second path or the third path, the selecting being based upon the second latency and the third latency, wherein the selecting is such that the selected path is capable of carrying packets from the source node to the destination node in less time than the one of the second path or the third path that is not selected; and facilitating a second transmission of one or more second packets from the source node to the destination node via the selected path.

One or more aspects of the subject disclosure include a method, comprising: repeatedly obtaining in a real-time manner, by a processing system including a processor, first data identifying a first network path between a switching center of a wireless network and an access point of the wireless network, wherein the first network path comprises at least one first intermediate router between the switching center and the access point, and wherein the first data comprises first real-time latency information identifying a first real-time latency that exists on the first network path between the switching center and the access point; repeatedly obtaining in a real-time manner, by the processing system, second data identifying a second network path between the switching center and the access point, wherein the second network path comprises at least one second intermediate router between the switching center and the access point, wherein the second network path is distinct from the first network path, and wherein the second data comprises second real-time latency information identifying a second real-time latency that exists on the second network path between the switching center and the access point; repeatedly obtaining in a real-time manner, by the processing system, third data identifying a third network path between the switching center and the access point, wherein the third network path comprises at least one third intermediate router between the switching center and the access point, wherein the third network path is distinct from both the second network path and the first network path, and wherein the third data comprises third real-time latency information identifying a third real-time latency that exists on the third network path between the switching center and the access point; facilitating a first communication of a first plurality of packets from the switching center to the access point via the first network path; and responsive to the first real-time latency being equal to or greater than a first threshold: selecting as a selected network path either the second network path or the third network path, the selecting being based upon the second real-time latency and the third real-time latency, wherein the selecting is such that the selected network path is capable of carrying packets from the switching center to the access point in less time than the one of the second network path or the third network path that is not selected; and facilitating a second communication of a second plurality of packets from the switching center to the access point via the selected network path.

Referring now to FIG. 1, a block diagram is shown illustrating an example, non-limiting embodiment of a system 100 in accordance with various aspects described herein. For example, system 100 can facilitate in whole or in part determining and utilizing one or more paths in a mobile network based upon current latencies (wherein, for example, the routing is based upon instantaneous latencies and results in a lowest latency non-shortest path routing). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
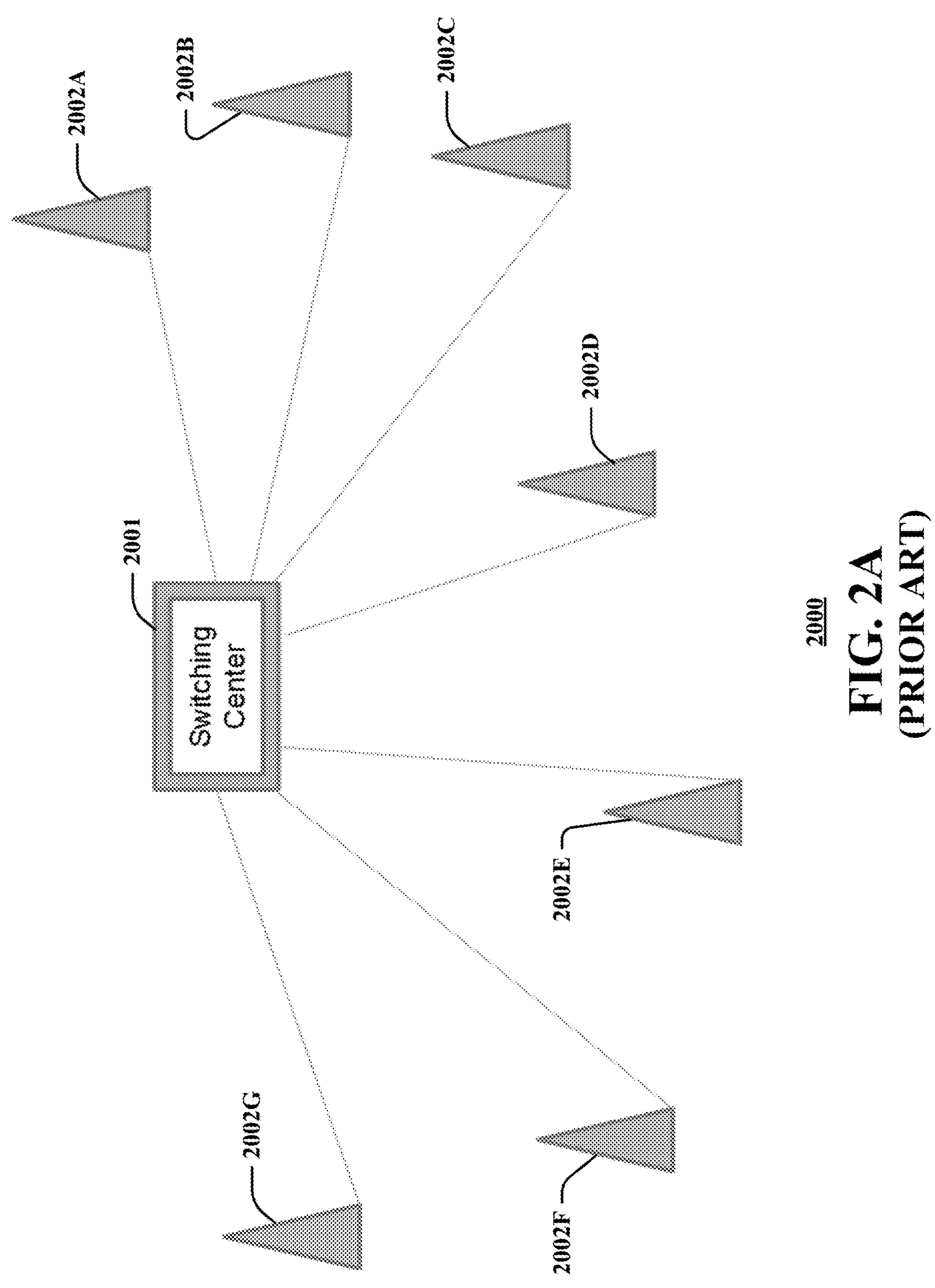
FIG. 2A is a block diagram illustrating a conventional network configuration (used, for example, to deploy a certain type of low latency network).

Referring now to FIG. 2A, this is a block diagram illustrating a conventional network configuration 2000 in which switching center 2001 is connected directly via respective fiber optic links to each of base stations 2002A, 2002B, 2002C, 2002D, 2002E, 2002F, and 2002G. In one example, an average fiber length between the switching center and a base station can be five miles. The costs involved in installing such dedicated fiber links can be significant.

Figure 2B:
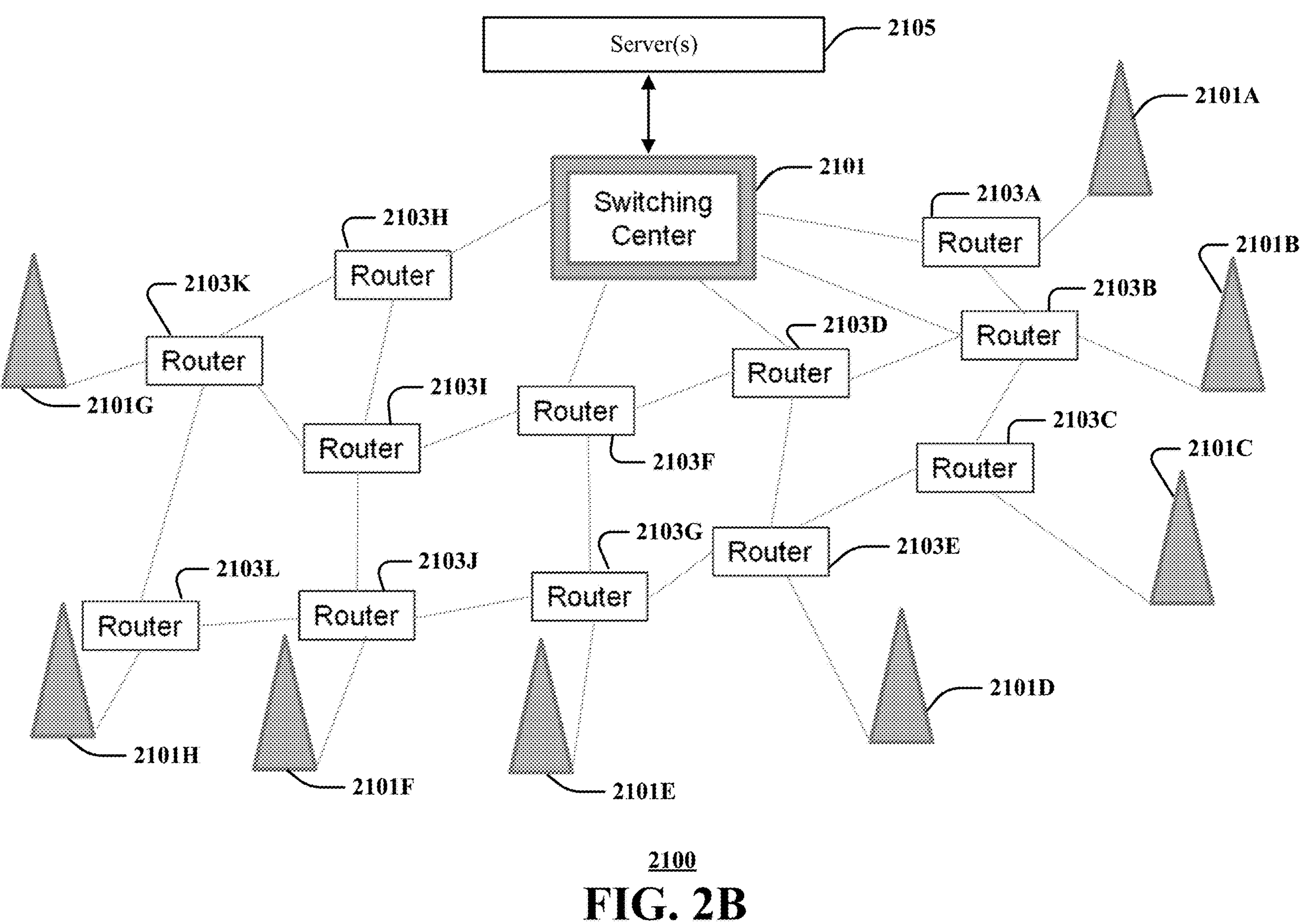
FIG. 2B is a block diagram illustrating an example, non-limiting embodiment of a network configuration (which can function fully or partially within the communication network of FIG. 1) in accordance with various aspects described herein.

Referring now to FIG. 2B, this is a block diagram illustrating an example, non-limiting embodiment of a network configuration 2100 (which can function fully or partially within the communication network of FIG. 1) in accordance with various aspects described herein. This network configuration 2100 can provide for a low-delay routed 5G/6G network. In this network configuration 2100, switching center 2101 is connected via various fiber optic links to each of base stations 2101A, 2101B, 2101C, 2101D, 2101E, 2101F, 2101G, and 2112H through one or more of routers 2103A, 2103B, 2203C, 2203D, 2103E, 2103F, 2132G, 2103H, 2103I, 2103J, 2103K, and 2103L. In one specific example, an average fiber length can be 1 mile. The costs involved in installing such various fiber links of network configuration 2100 can be lower than the fiber installation costs associated with the network configuration 2000 mentioned above (in this regard, it is noted that fiber installation costs typically dominate costs of the network as trenching, with all its problems such as severing utility lines, crossing roads, gaining right of way, is very expensive). In various embodiments, server(s) 2105 can perform functions to facilitate lowest latency non-shortest path routing as described herein. In one example, the server(s) 2105 are external to switching center 2101. In another example, server(s) 2105 are part of switching center 2101. In one example, server(s) 2105 can receive data/information from the switching center, from one or more of the routers, and/or from one or more of the base stations. In one example, server(s) 2105 can send data/information to the switching center, to one or more of the routers, and/or to one or more of the base stations.

Reference will now be made to elements of delay according to an embodiment (for the purposes of this discussion see, for example, network configuration 2100 of FIG. 2B; also, note that these values are provided as non-limiting examples, and other values may be utilized as appropriate). More particularly: (a) Propagation delay—at roughly ⅔ speed of light (124 miles=1 ms); (b) Serialization delay—wholly dependent on link speed (10G+1500 bytes=1.2 u sec); (c) Queueing delay—maximum dependent on output queue size (e.g., 50 ms common in traditional routers; main contributor to maximum end-to-end delay; (d) Switching delay—dependent on CPU power of router and its load; can be virtually eliminated with cut through switching; CRC of header checked before putting packet in output queue; small amount of input queueing.

Reference will now be made to delay reduction techniques according to an embodiment (for the purposes of this discussion see, for example, network configuration 2100 of FIG. 2B; also, note that these values are provided as non-limiting examples, and other values may be utilized as appropriate). More particularly: (a) Short queues (e.g., 250 microsecond output queues, but carefully managed); (b) Update routing tables up to 500,000 times per second with current delay information from nearby nodes (in one specific example, can require 130 TOp GPU); (c) Flood delay updates when any queue changes by 50 usec to all routers within 250 usec; TTL is time; update dropped at next link after TTL exceeded (limiting range of routing updates to useful updates); each router has its 250 usec range of influence; lower TTL updates given less weight as info has aged more; (d) Change paths in microseconds when delay rises on one path; (e) Route traffic around congestion, even taking a longer path with less delay (in a manner analogous to GOOGLE MAPS, which may direct a traveler on a longer route that has less traffic).

Reference will now be made to delay updates according to an embodiment (for the purposes of this discussion see, for example, network configuration 2100 of FIG. 2B). More particularly:

- Synchronous updates—Flooded reliably by each router every 10 ms
  - Provides full route table update to all adjacent routers, who also further forward improvements when TTL positive. Resets route delay distances. Uses protocol such as described in draft-ietf-ospf-isis-flood-opt-01.txt.
- Asynchronous updates—Flooded unreliably whenever queue passes 50 usec threshold
  - 50 usec hysteresis
  - Only affected routes included in updates, which are also forwarded so long as TTL positive as well
- Two delay values sent for each route update
  - Unweighted—actual delay on path. Used for buffering on route change.
  - Weighted—queue depth weighted by factor X. Weighted depth=depth*X^((depth/50)−1), where depth is a multiple of 50 usec. 1<=X<=5. Used for route calculations of shortest delay.
- Choosing X
  - X used to balance packet loss and delay. Higher packet loss (X low) will provide lower delay. Higher delay (X high) will provide lower packet loss.
  - X>1 makes the protocol more likely to change routes. Higher X appropriate for longer length (in usec) links to avoid packet loss.

Figure 2C:
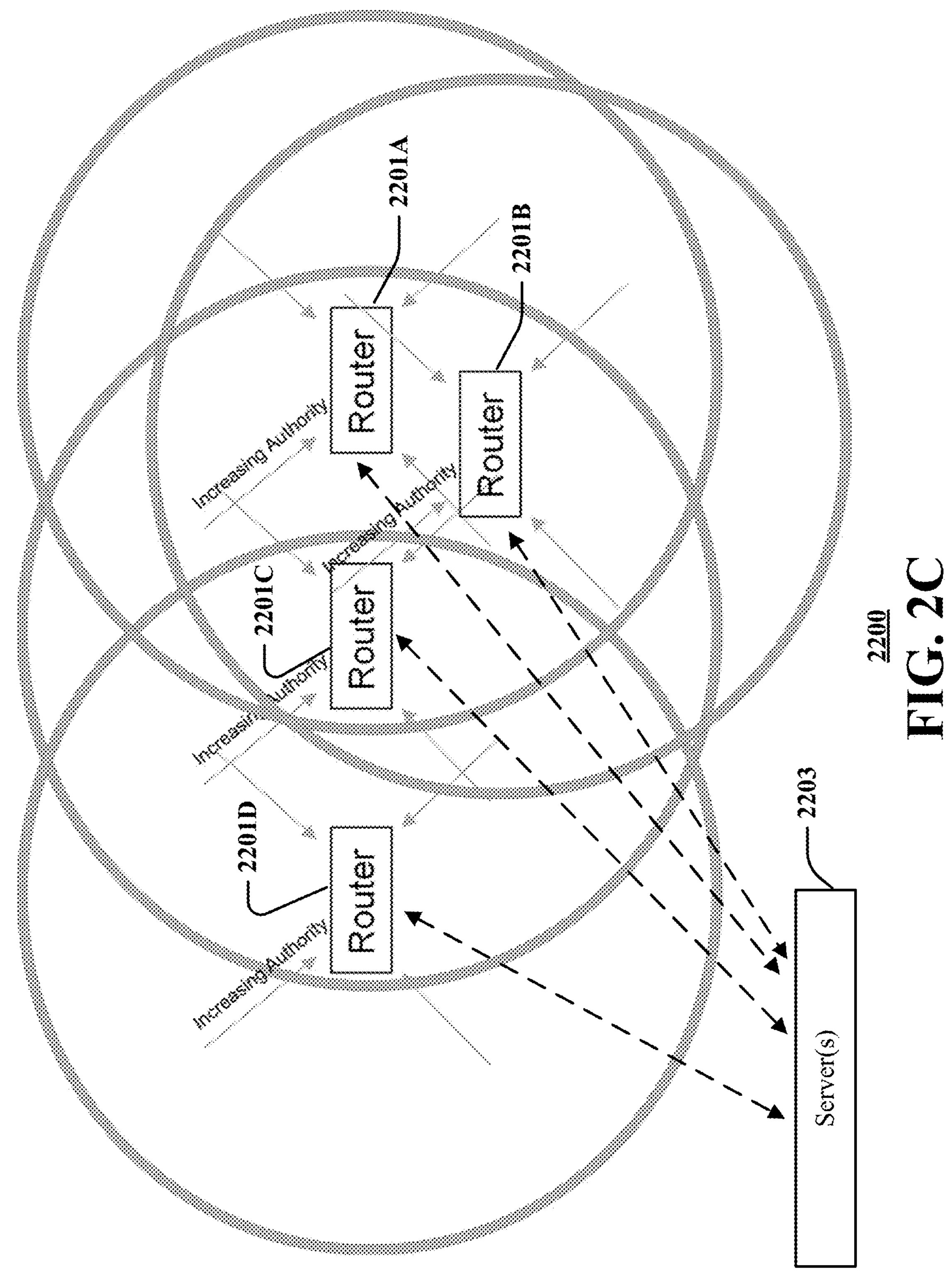
FIG. 2C is a block diagram illustrating an example, non-limiting embodiment of authoritative domains (which can function fully or partially within the communication network of FIG. 1) in accordance with various aspects described herein.

Referring now to FIG. 2C, this is a block diagram illustrating an example, non-limiting embodiment of authoritative domains for delay updates (TTL impact) 2200 in accordance with various aspects described herein. As seen, routers 2201A, 2201B, 2201C, and 2201D are shown along with corresponding authoritative domains. In various embodiments, server(s) 2203 can be in communication (directly or indirectly) with the routers to perform functions to facilitate lowest latency non-shortest path routing as described herein.

Reference will now be made to authority calculation according to an embodiment (for the purposes of this discussion see, for example, authoritative domains 2200 of FIG. 2C). More particularly:

- From source:
  - Authority=1,000,000/((abs(dQ/dt))*((Queue length)−TTL)*((new delay value)/(old delay value))) in 1/sec. dQ/dt over previous 50 usec.
- Subsequent routers:
  - Authority=source authority−1,000,000/(((Q length)−TTL)*((new delay value)/(old delay value)))
- Authority can be negative. More positive authority always better.
- New delay value can be higher than old value if new value has greater authority. It is authority, not magnitude of delay value, that determines whether or not it is used. It is better to use an update from much closer, even if it is not an improvement in delay, than to use a more attractive, but obsolete update from farther away. It is also better to use an update from a slowly changing queue than from a rapidly changing one.

Reference will now be made to queues according to an embodiment. More particularly: (a) Data plane queue—250 usec on each output; (b) Control plane queue—10 usec on each output, highest priority for delay updates; (c) Input queues—on each input, until packet can be switched; (d) Reroute buffers—Variable length. Delay delivery to output queue by differential in packet delay between old and new paths. Eliminates packet reordering ((i) Changes next hop for rerouted traffic temporarily to buffer; (ii) Multiple reroutes will result in multiple buffers per interface, one per change in routing table. 250 usec of buffers should be sufficient per interface.).

Reference will now be made to main protocols according to an embodiment. More particularly: (a) Control protocol for data is a Delay (distance) Vector based protocol, but repeated for each router. Each router has its own routed domain. The entire network is composed of as many routing domains as there are routers; (b) Control protocol for route update traffic is flooding, unreliable for asynchronous updates and reliable for synchronous updates. Load on network reduced due to TTL of delay updates, which by default is 250 usec, or about 31 miles in fiber, with the trunk protocol. Also, repeated updates on different paths from the same source are discarded and not processed; (c) Two versions for above protocols: trunk and cluster. Trunk operates with 250 usec queues, 50 usec thresholds for async updates, and 10 ms full table updates. Cluster uses same protocol with values/10; (d) Protocol for management traffic is SNMP, and each router has an internal IP address for management. SNMP traffic travels in the route update queues to avoid congestion caused by customer traffic.

Referring now to FIG. 2D, this is a block diagram illustrating an example, non-limiting embodiment of a route table 2300 (which can function fully or partially within the communication network of FIG. 1) in accordance with various aspects described herein. In various examples: (a) New update for a network used only if it has higher authority. Entries completely updated every 10 ms with sync updates. New wins tie; (b) Delay single precision integer 32 bits. Authority same. 20 bytes per entry for IPv4.

Figure 2E:
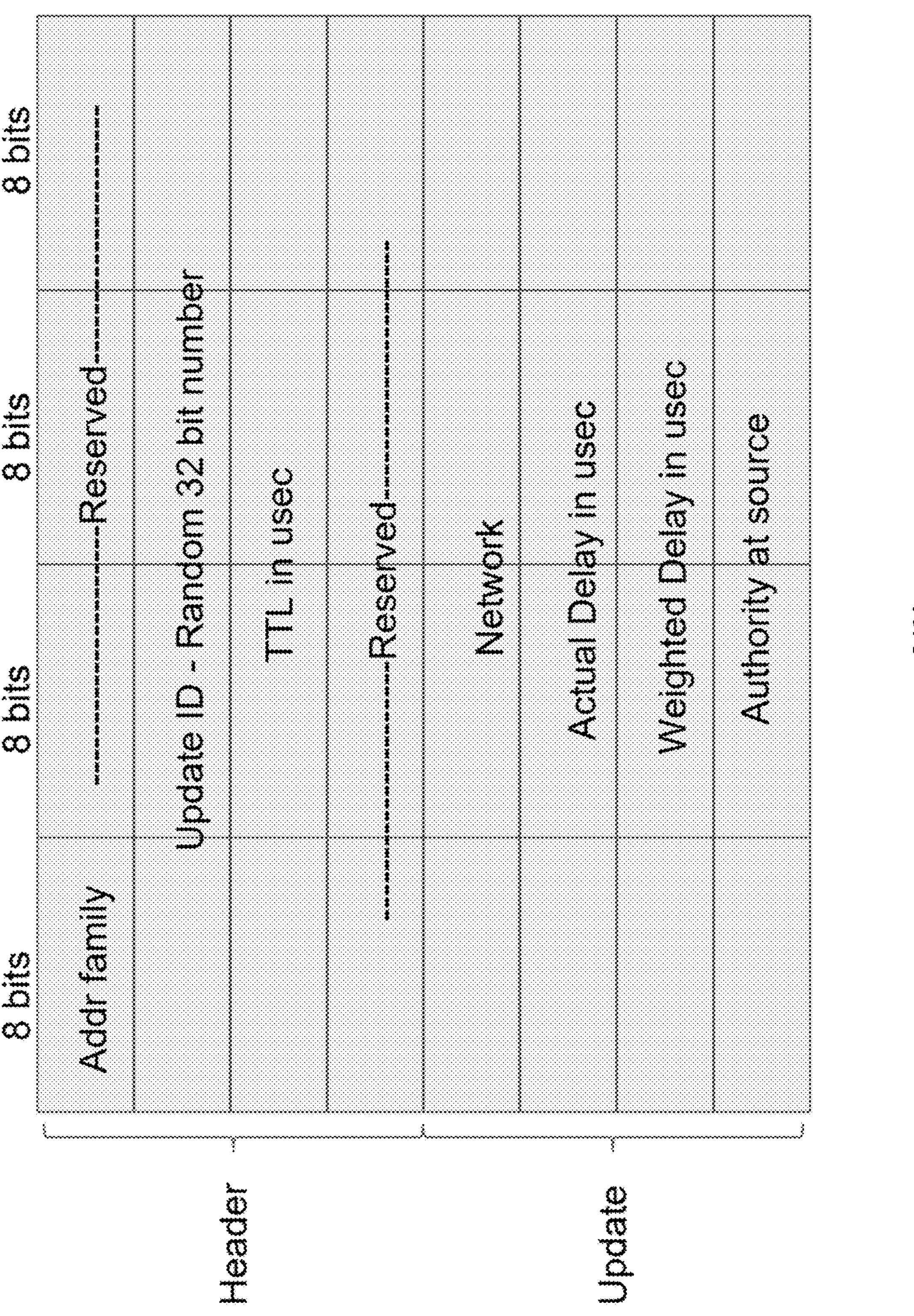
FIG. 2E is a block diagram illustrating an example, non-limiting embodiment of a route update packet (which can function fully or partially within the communication network of FIG. 1) in accordance with various aspects described herein.

Referring now to FIG. 2E, this is a block diagram illustrating an example, non-limiting embodiment of a route update packet (IPv4) in accordance with various aspects described herein.

Reference will now be made to handling of queue updates according to an embodiment. More particularly:

- A 50 us change in queue depth results in an asynchronous delay update sent to all nodes (in TTL+one hop). Updates sent at 50, 100, 150, 200, and 250 usec.
- A configurable parameter is used as a backoff factor. 50 usec is x^0, 100 usec is x^1, 150 usec is x^2, 200 usec is x^3, 250 usec is x^4. Floating point x can range from 1.0 (linear backoff) to 5.0 (highly accelerated backoff). Weighted delay is (actual delay)×(backoff factor). Higher configured values will result in greater avoidance of that path under congestion as the weighted value will be higher.
- Regardless, routers will send full delay updates every 10 ms. Route engines need to handle both asynchronous updates on delay changes as well as periodic updates sent every 10 ms. Precision of updates 1 usec. Delay update traffic wholly inconsequential with 10G and 40G backbone links as they only travel 250 usec and then are dropped. Network is not flooded with updates.
- High propagation delay makes queue updates stale, but then propagation delay predominates and will have the most influence on the routing decision anyway. Discard updates on hop after TTL exceeded. TTL in microseconds and decremented at each hop based on link delay.

- Updates will be accepted even on very long links, though they will not be forwarded.
- Each node will have a different area in which it has the best information, creating an optimization area around each node. The network will be composed of areas centered on the nodes. Together, the nodes will determine the best path for a packet as it traverses the network in a distributed fashion. Owing to propagation delay of delay updates, the optimization will improve the closer the packet gets to its destination. But best information, constrained by propagation delay, will be used at each hop. No better routing based on delay possible without exceeding c.

Figure 2F:
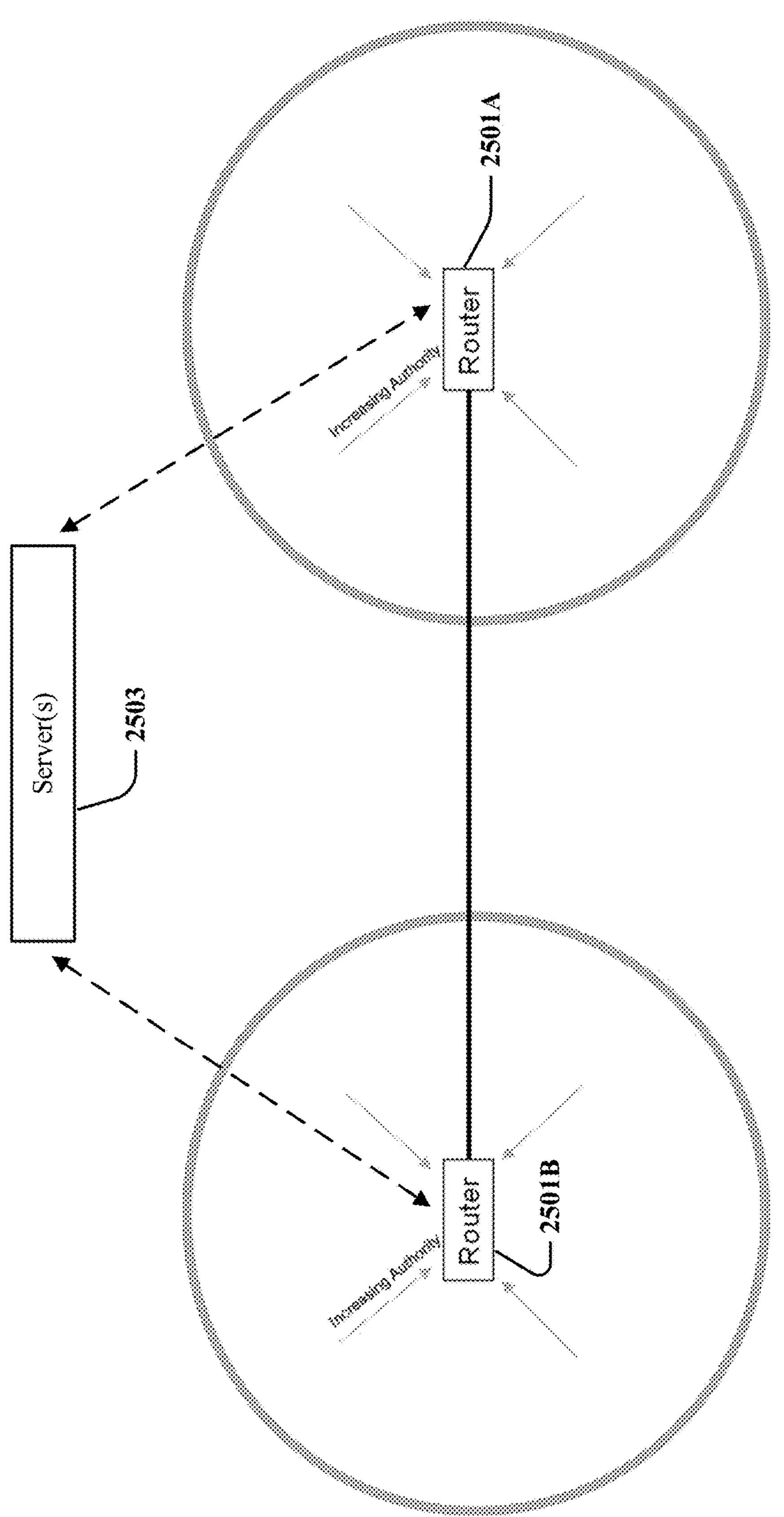
FIG. 2F is a block diagram illustrating an example, non-limiting embodiment of routing between authoritative domains (which can function fully or partially within the communication network of FIG. 1) in accordance with various aspects described herein.

Reference will now be made to impact of backoff delay according to an embodiment. More particularly:

- Balance between packet loss and delay
- Smaller backoff factor introduces less delay, but allows for more packet loss
- Larger backoff factor encourages rerouting to higher delay paths to avoid packet loss, but it introduces more delay to the packets on that path
- Management system can change them network wide to better meet SLAs, but changes will affect other traffic, and larger picture must be considered
  - Calculations of changes highly complex
  - Results probabilistic, not deterministic, because they depend on traffic introduced to network Referring now to FIG. 2F, this is a block diagram illustrating an example, non-limiting embodiment of routing between authoritative domains 2500 in accordance with various aspects described herein. As seen, routers 2501A, 2501B are shown along with corresponding authoritative domains. In various examples: (a) Delay updates authoritative one hop outside 250 usec, when TTL first negative; (b) In widely dispersed network, routers act like legacy routers routing on delay for distance. In various embodiments, server(s) 2503 can be in communication (directly or indirectly) with the routers to perform functions to facilitate lowest latency non-shortest path routing as described herein.

Reference will now be made to preventing out of order delivery according to an embodiment. More particularly:

- Packets will be delivered out of order if their path can switch to one with less delay
- Both weighted and actual delay reported in route updates
- Actual delay used to calculate how much closer new route is, weighted delay used for routing decisions
- Packets queued in special, central queue for differential in delay before being sent down new, shorter path
- Adds no extra delay to traffic, which subsequently experiences lower delay
- Necessary for inverse multiplexing, rerouting around failures and congestion, and for load sharing
- Removes burden from end points and additional delay to reorder packets Reference will now be made to certain built-in features according to an embodiment. More particularly:

- Automatic rerouting around failures and congestion in usec., reducing packet loss. Will even reroute a packet in transit after a failure or congestion occurs.
- Load balancing across similar delay links. Allows for higher speed access links, certainly ones equal to backbone links.
- Inverse multiplexing across similar delay links—can have 40 Gbps access with 10 Gbps backbone links, if enough of them. Not recommended, but possible.
- Will carry packet at low delay until capacity of network is reached. At that point, no amount of queueing can help.
- Sophisticated handling of small queues to prevent packet loss. May have better loss characteristics than existing networks, and it still delivers low delay.

Figure 2G:
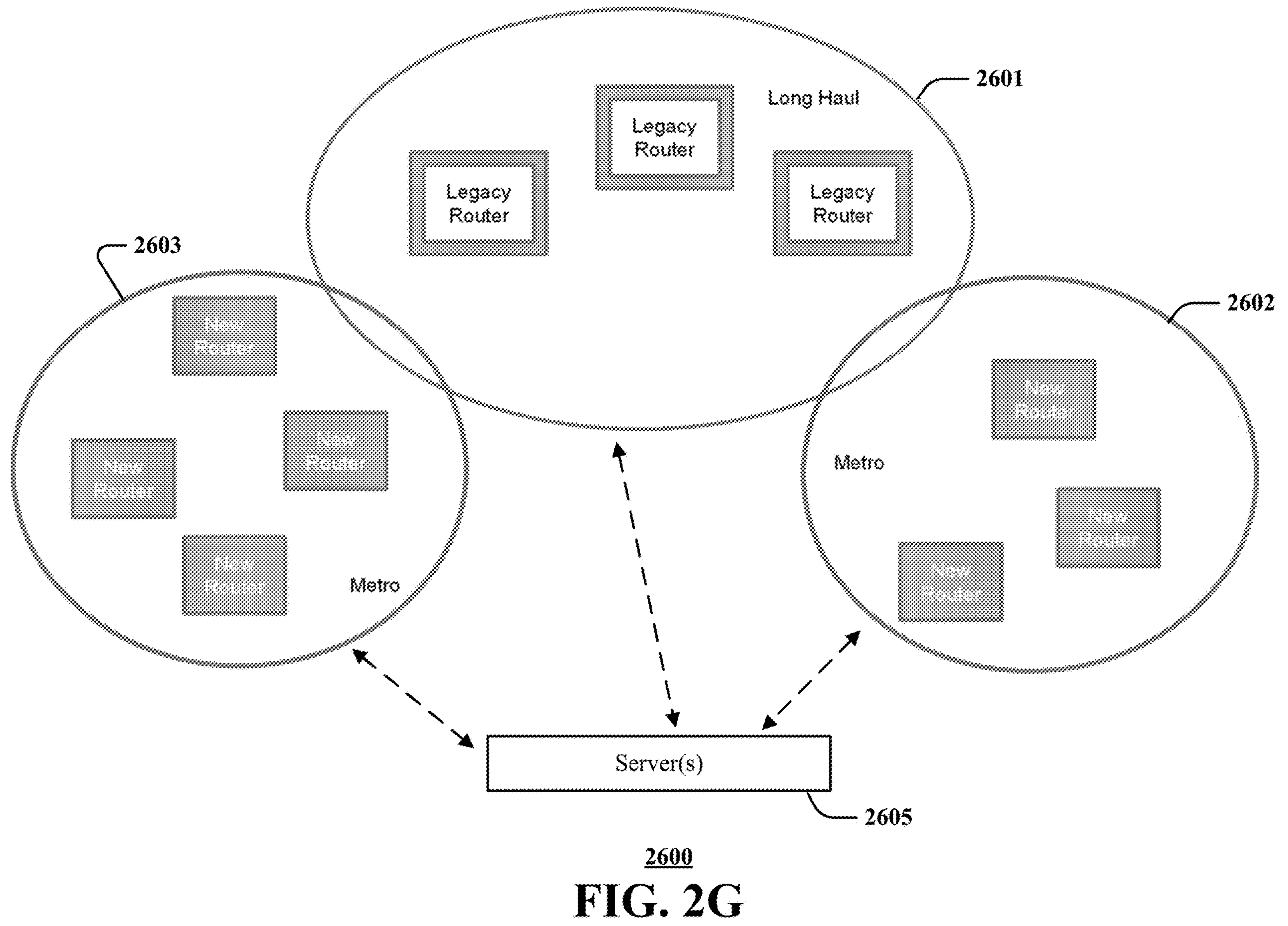
FIG. 2G is a block diagram illustrating an example, non-limiting embodiment of mixed networks, metro optimization (which can function fully or partially within the communication network of FIG. 1) in accordance with various aspects described herein.

Referring now to FIG. 2G, this is a block diagram illustrating an example, non-limiting embodiment of mixed networks, metro optimization 2600 in accordance with various aspects described herein. As seen, in this example, three legacy routers are associated with a long haul configuration 2601. Further, in this example, three new routers are associated with metro (metropolitan) region 2602. Further still, in this example, three new routers are associated with metro (metropolitan) region 2603. In various embodiments, server(s) 2605 can be in communication (directly or indirectly) with the routers to perform functions to facilitate lowest latency non-shortest path routing as described herein.

Figure 2H:
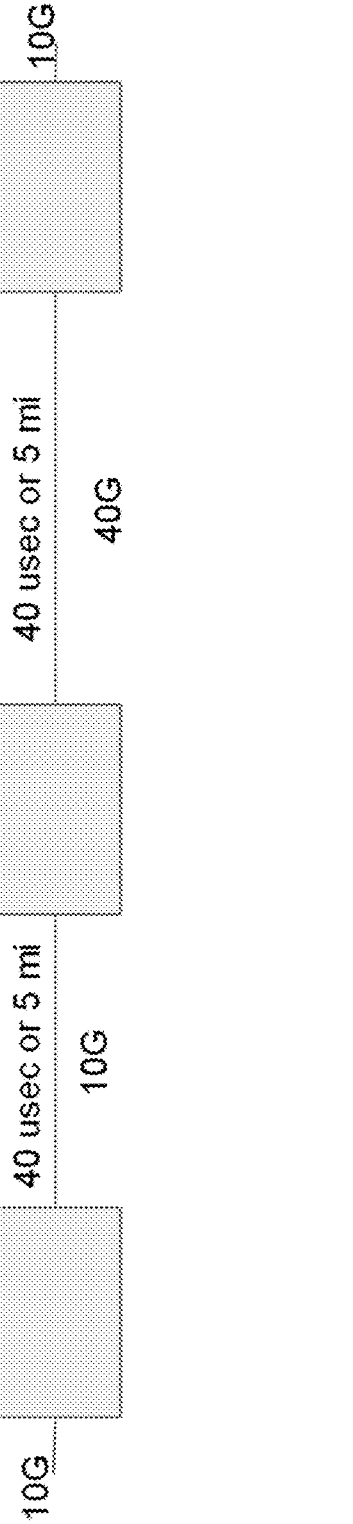
FIG. 2H is a block diagram illustrating an example, non-limiting embodiment of end-to-end delay (which can function fully or partially within the communication network of FIG. 1) in accordance with various aspects described herein.
Figure 2I:
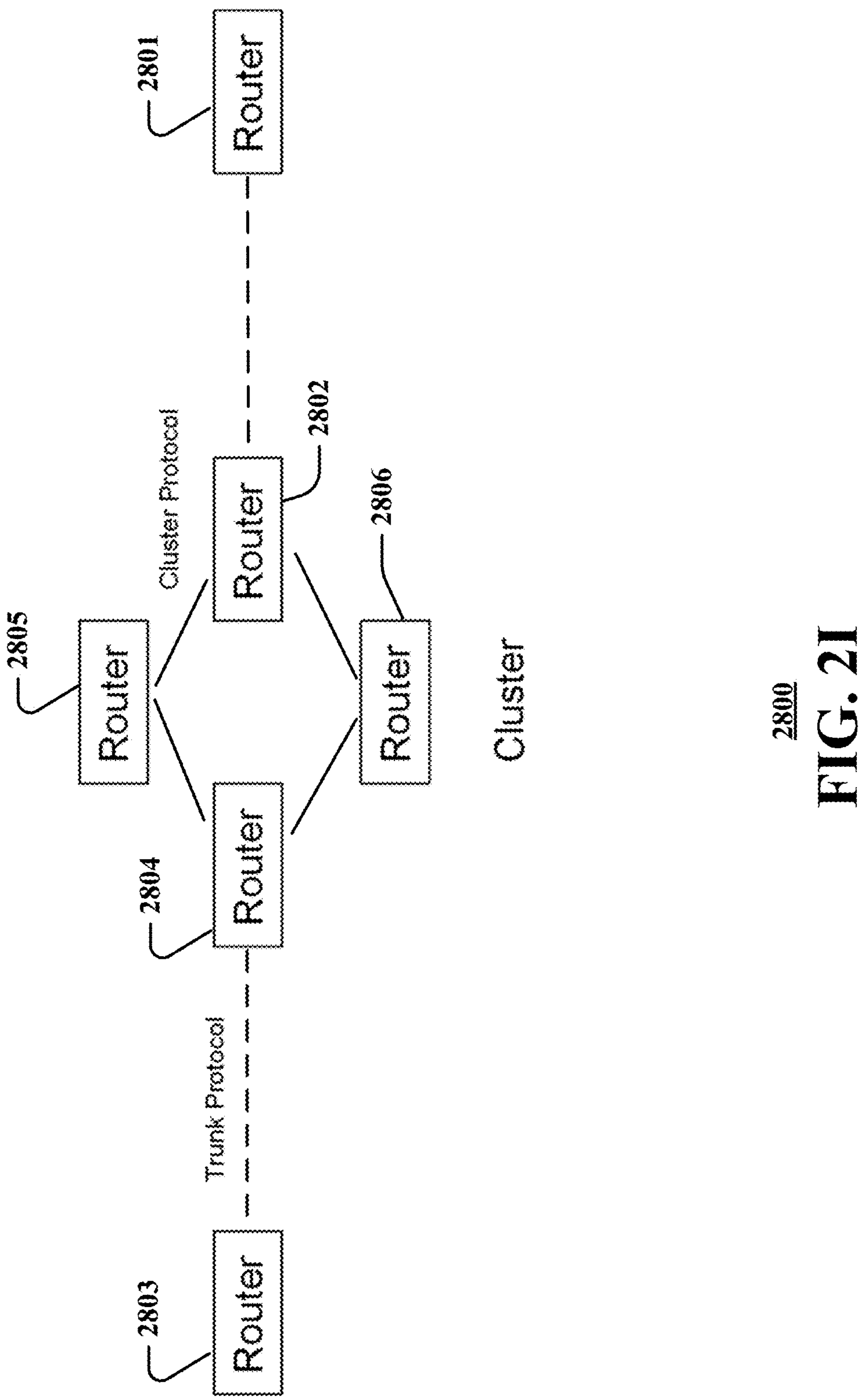
FIG. 2I is a block diagram illustrating an example, non-limiting embodiment of a cluster node (which can function fully or partially within the communication network of FIG. 1) in accordance with various aspects described herein.

Referring now to FIG. 2H, this is a block diagram illustrating an example, non-limiting embodiment of end-to-end delay 2700 in accordance with various aspects described herein. In this example:

- Propagation—80 usec
- Serialization—1500 bytes—1.2+1.2+0.3+1.2=3.9 usec max if queued always
- Switching—almost 0 (cut through)
- Queueing—max 3×250 usec or 750 usec, but normally 0
- Total=80+3.9+0+750=833.9 usec MAX delay end-to-end, or less than 1 ms, minimum and typical of less than 83.9 usec, which is virtually identical to that of point-to-point fiber Referring now to FIG. 2I, this is a block diagram illustrating an example, non-limiting embodiment of a cluster node 2800 in accordance with various aspects described herein. In this example, router 2801 and 2802 are connected by a trunk protocol (see the dashed line) and router 2803 and 2804 are connected by a trunk protocol (see the dashed line). Further, in this example, router 2802 and 2805 are connected by a cluster protocol (see the solid line), router 2802 and 2806 are connected by a cluster protocol (see the solid line), router 2804 and 2805 are connected by a cluster protocol (see the solid line), and router 2804 and 2806 are connected by a cluster protocol (see the solid line). In various examples: (a) Cluster is built like modern supercomputer; (b) Same performance as single node in delay, higher in throughput; (c) Cluster protocol is a scaled version of trunk protocol. Cluster nodes must run both.

Reference will now be made to updating routing table according to an embodiment. More particularly, in various examples: (a) Support up to 5,000,000 updates per second, virtually all asynchronous updates. This provides for up to 250 asynchronous updates over 50 usec, necessary for clusters; (b) 130 TOps/sec GPU/500,000 updates per second=260M calculations per routing update—enough power to optimize on other parameters. 26M calculations per routing update in cluster protocol. Still should be sufficient; (c) Routing table will be updated every 2 usec with information no older than 250 usec, and partial sent out as often as every 50 usec for each trunk interface; (d) Off the shelf GPU solution for routing table can be utilized; (d) Future GPU improvements should allow for more asynchronous updates and provide even more current information.

Reference will now be made to interoperating with other routers according to an embodiment. More particularly, in various examples: (a) Different routers (e.g., legacy routers) can be mixed with routers according to various embodiments, though the delay of the legacy routers may prevent effective optimization; (b) It may be best to limit an area to only these legacy routers and have them interoperate at the edges; (c) Certain routers (e.g., legacy routers) can support other routing protocols, such as RIP, OSPF, and BGP, and these may be best used at the edge of an area of these legacy routers; (d) Metros (metropolitan areas) of these legacy routers connected by traditional router networks can be an attractive solution. These legacy routers can still be used in wider IP networks and will still optimize delay—in one specific example, direct influence of routers will be limited to adjacent routers if links are longer than 31 miles.

Reference will now be made to network management according to an embodiment. More particularly, in various examples: (a) Nature of network, with its distributed decision making and complex, constantly changing routing, makes troubleshooting also complex; (b) AI can be provided to assist the operator in discovering problems and understanding status of network; (c) Low delay through network will assist in providing operator with information, but that information can change thousands of times a second, and most of it will not be current as the operator will be too far in time from the problem, which may come and go in usec. (d) An intelligent system distributed amongst the nodes can be used to manage the network with the speed to react to problems as they occur; (e) GPUs, which are highly capable for AI calculations, can be used (GPU can route and manage network).

Reference will now be made to hardware configurations according to an embodiment. More particularly, in various examples: (a) Each router can be a small white box router (e.g., 4× 40G, 16× 10G); (b) Each router can be a medium white box router (e.g., 5× 100G, 10× 40G, 40× 10G); (c) A cluster of medium white box routers can be used—Much higher capacity than a single node with equivalent delay performance of a single node. Flexible configurations. Maximum link length of 100 meters. 100G and 40G interconnects. Separate routing domain from WAN using a scaled version of WAN protocol. No hard stop on size. Uses same load management methods as WAN protocol. Scaling limited only by delay through cluster, which increases by about 25 usec per hop.

Figure 2J:
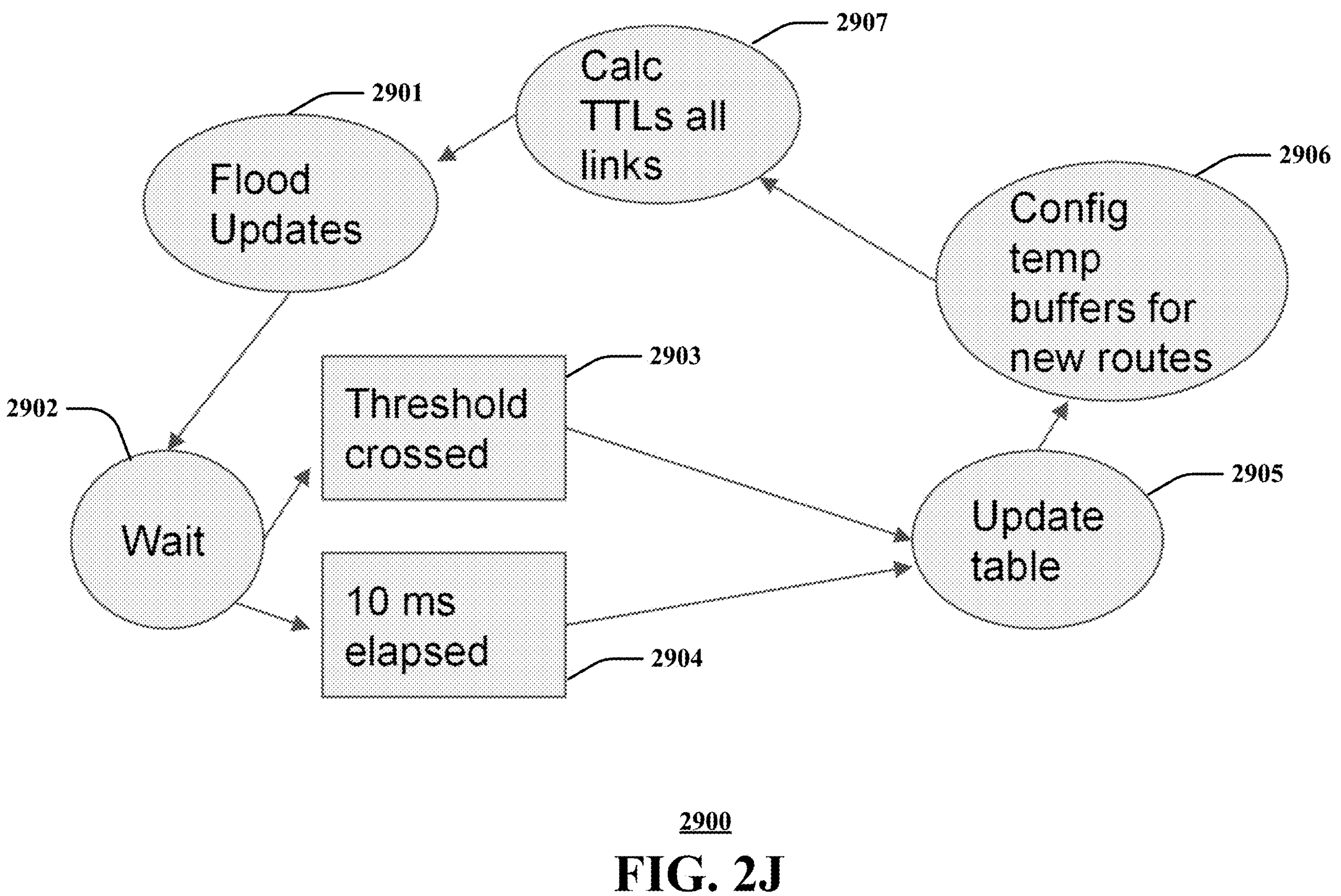
FIG. 2J is a block diagram illustrating an example, non-limiting embodiment of a flow diagram (which can function fully or partially within the communication network of FIG. 1) in accordance with various aspects described herein.

Referring now to FIG. 2J, this is a block diagram illustrating an example, non-limiting embodiment of a flow diagram 2900 associated with the control plane (with respect to a source of update) in accordance with various aspects described herein. At step 2901 flood updates are performed. At step 2902 the process waits. If a threshold is crossed (see step 2903) the process continues to update table (see step 2905). On the other hand, if 10 ms has elapsed (see step 2904) the process continues to update table (see step 2905). In various examples: updates can be sent for 50 usec crossing in any data output queue; 50 usec hysteresis can be provided to prevent excessive control traffic; only affected routes sent; complete route table can be sent every 10 ms; each update can be marked with random single precision 32 bit number at source to determine uniqueness of subsequent updates. From update table (step 2905), step 2906 (configure temporary buffers for new routes) is performed. In various examples: (a) calculated TTL is 250 usec—queue depth/link speed—propagation delay; range 250 usec down to negative thousands of usec (long link in delay). Then step 2907 (calculate TTLs for all links) is then performed. Finally, flood updates (step 2901) is again performed. The process can then repeat.

Figure 2K:
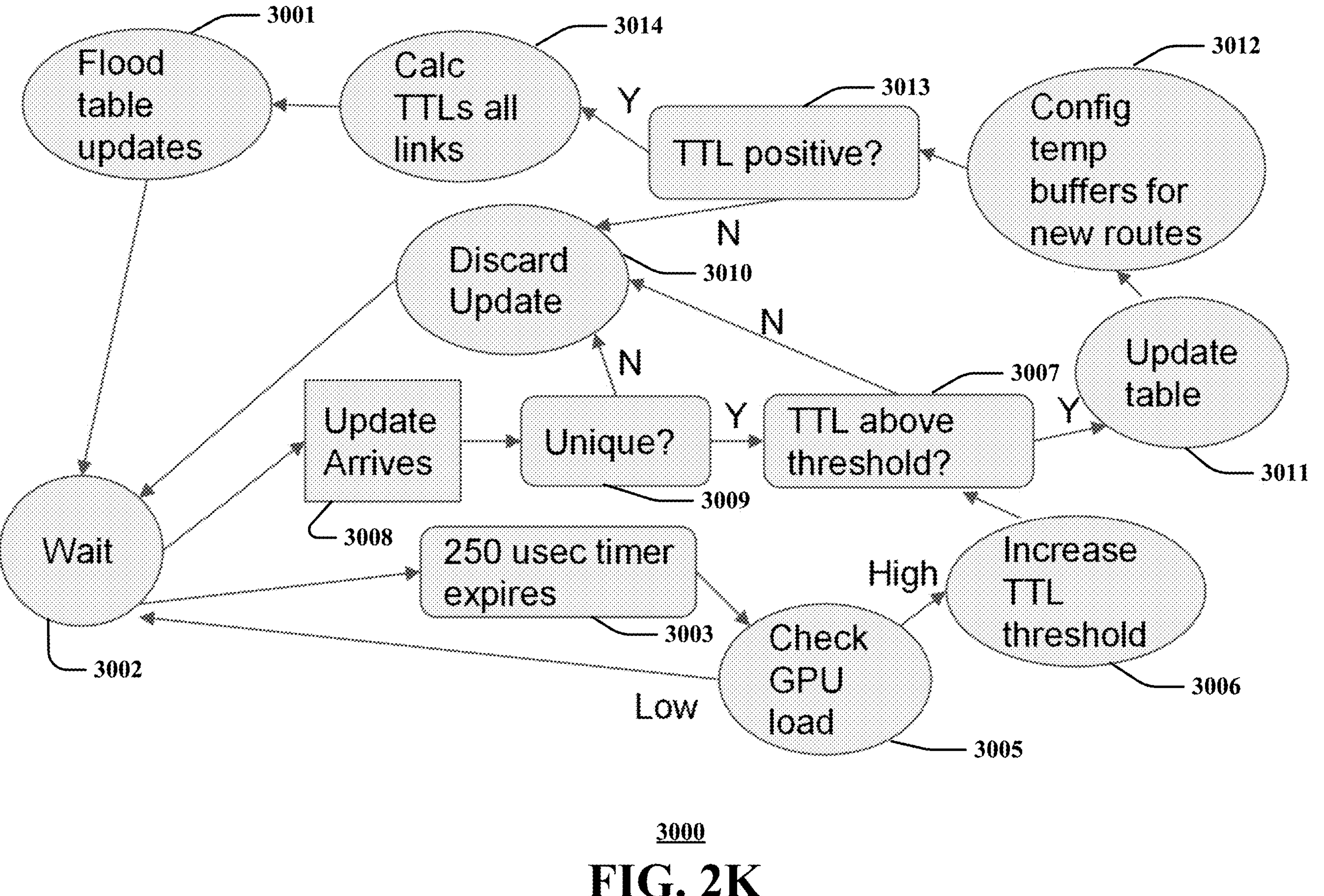
FIG. 2K is a block diagram illustrating an example, non-limiting embodiment of a flow diagram (which can function fully or partially within the communication network of FIG. 1) in accordance with various aspects described herein.

Referring now to FIG. 2K, this is a block diagram illustrating an example, non-limiting embodiment of a flow diagram 3000 associated with the control plane (with respect to a non-source (that is, receiver) of update) in accordance with various aspects described herein. At step 3001 flood table updates is performed. At step 3002 the process waits. If a 250 usec timer expires (see step 3003) the process continues to check GPU load (see step 3005). If the GPU load is "Low", the process returns to step 3002. If the GPU load is "High", the process continues to increase TTL threshold (see step 3006). From increase TTL threshold, the process continues to step 3007 (TTL above threshold?). Referring back now to step 3002 (Wait), if an update arrives (see step 3008) then step 3009 is performed (Unique?). If "Yes", then the process continues to step 3007 (TTL above threshold?). If "No", then the process continues to discard update (see step 3010) and then back to wait (step 3002). If TTL above threshold? (see step 3007) is "No", then the process returns to discard update (see step 3010). If "Yes", then the process continues to update table (see step 3011). From step 3011, the process continues to step 3012 (configure temporary buffers for new routes). From step 3012 the process goes to step 3013 (TTL positive?). If "No", then the process returns to discard update (see step 3010). If "Yes" then the process continues to step 3014 (Calculate TTLs for all links). Finally, flood updates (step 3001) is again performed. The process can then repeat.

Figure 2L:
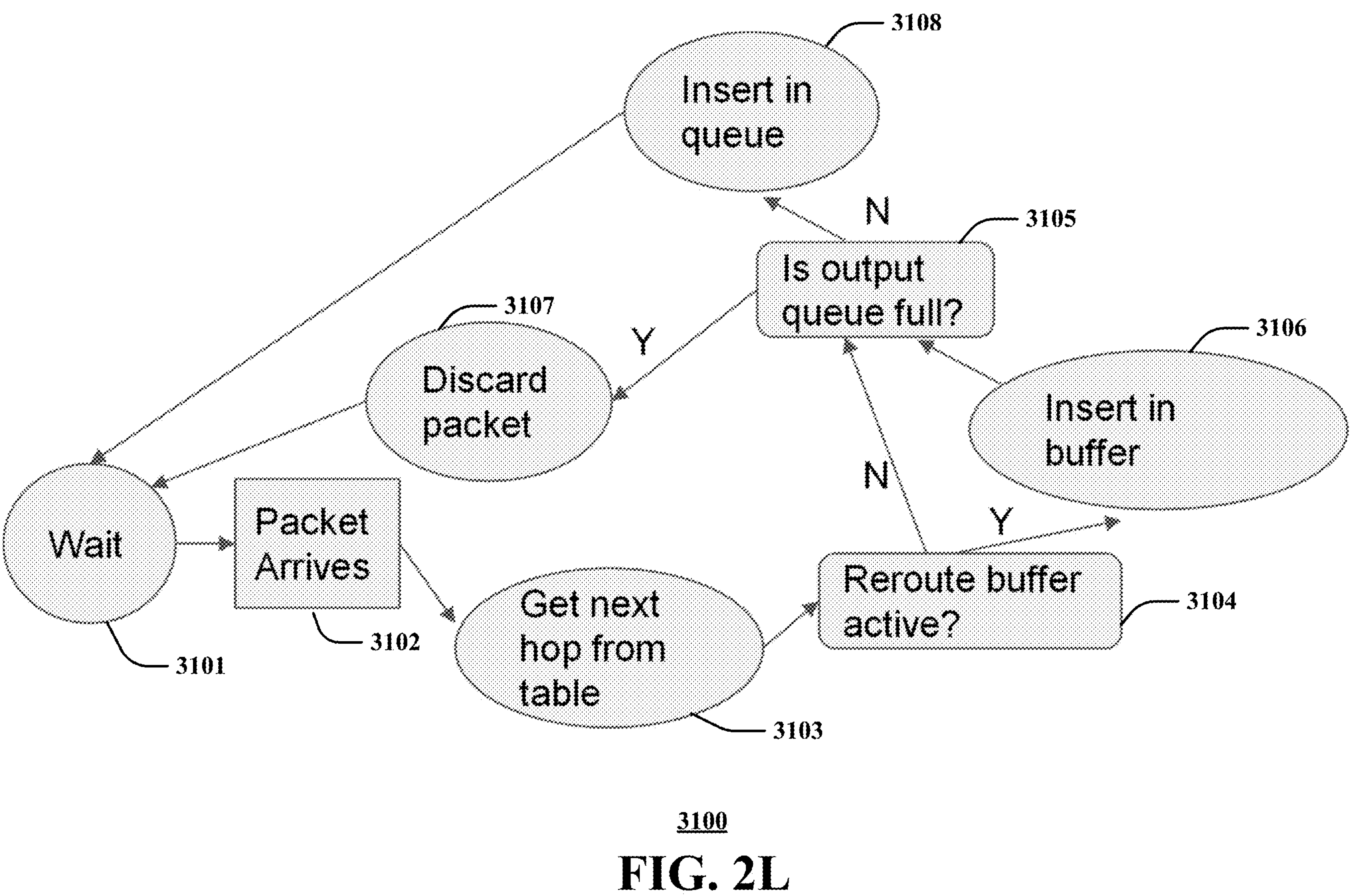
FIG. 2L is a block diagram illustrating an example, non-limiting embodiment of a flow diagram (which can function fully or partially within the communication network of FIG. 1) in accordance with various aspects described herein.

Referring now to FIG. 2L, this is a block diagram illustrating an example, non-limiting embodiment of a flow diagram 3100 associated with the data plane in accordance with various aspects described herein. At step 3101 the process waits. At step 3102 a packet arrives. The process then continues to step 3103 (get next hop from table). From step 3103 the process goes to step 3104 (Rerout buffer active?). If "No" the process goes to step 3105 (Is output queue full?). If "Yes" the process goes to step 3106 (Insert in buffer). From insert in buffer, the process continues with step 3105. If output queue is full, (that is, "Yes"), then the process goes to step 3107 (discard packet) and then back to wait (step 3101). On the other hand, if output queue is not full (that is, "No") then the process continues to step 3108 (insert in queue). Finally, wait (step 3101) is again performed. The process can then repeat.

Referring now to FIG. 2M, various steps of a method 3200 according to an embodiment are shown. As seen in this FIG. 2M, step 3201 comprises obtaining first information identifying a first path between a source node located in a network and a destination node located in the network, wherein the first path comprises a first plurality of nodes including at least one first intermediate node between the source node and the destination node, and wherein the first information comprises first latency information that identifies a first travel latency that exists on the first path between the source node and the destination node. Next, step 3202 comprises obtaining second information identifying a second path between the source node and the destination node, wherein the second path comprises a second plurality of nodes including at least the source node and the destination node, wherein the second path is not the same as the first path, and wherein the second information comprises second latency information that identifies a second travel latency that exists on the second path between the source node and the destination node. Next, step 3203 comprises selecting as a selected path either the first path or the second path, the selecting being based upon the first travel latency and the second travel latency, wherein the selecting is such that the selected path is capable of carrying a packet from the source node to the destination node in less time than the one of the first path or the second path that is not selected.

In one embodiment, there may be no intermediate node (that is, there may be just source and destination nodes in a path). In other embodiments there may be one or more intermediate nodes in a path.

While for purposes of simplicity of explanation, the respective processes are shown and described as a series of blocks in FIG. 2M, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2N, various steps of a method 3300 according to an embodiment are shown. As seen in this FIG. 2N, step 3301 comprises obtaining first data identifying a first path between a source node of a network and a destination node of the network, wherein the first path comprises at least one first intermediate router between the source node and the destination node, and wherein the first data comprises first latency information identifying a first latency that exists on the first path between the source node and the destination node. Next, step 3302 comprises obtaining second data identifying a second path between the source node and the destination node, wherein the second path comprises at least one second intermediate router between the source node and the destination node, wherein the second path is not the same as the first path, and wherein the second data comprises second latency information identifying a second latency that exists on the second path between the source node and the destination node. Next, step 3303 comprises obtaining third data identifying a third path between the source node and the destination node, wherein the third path comprises at least one third intermediate router between the source node and the destination node, wherein the third path is not the same as the first path or the second path, and wherein the third data comprises third latency information identifying a third latency that exists on the third path between the source node and the destination node. Next, step 3304 comprises facilitating a first transmission of one or more first packets from the source node to the destination node via the first path. Next, step 3305 comprises responsive to the first latency meeting a first threshold: selecting as a selected path either the second path or the third path, the selecting being based upon the second latency and the third latency, wherein the selecting is such that the selected path is capable of carrying packets from the source node to the destination node in less time than the one of the second path or the third path that is not selected; and facilitating a second transmission of one or more second packets from the source node to the destination node via the selected path.

In one embodiment, there may be no intermediate node (that is, there may be just source and destination nodes in a path). In other embodiments there may be one or more intermediate nodes in a path.

While for purposes of simplicity of explanation, the respective processes are shown and described as a series of blocks in FIG. 2N, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2O, various steps of a method 3400 according to an embodiment are shown. As seen in this FIG. 2O, step 3401 comprises repeatedly obtaining in a real-time manner, by a processing system including a processor, first data identifying a first network path between a switching center of a wireless network and an access point of the wireless network, wherein the first network path comprises at least one first intermediate router between the switching center and the access point, and wherein the first data comprises first real-time latency information identifying a first real-time latency that exists on the first network path between the switching center and the access point. Next, step 3402 comprises repeatedly obtaining in a real-time manner, by the processing system, second data identifying a second network path between the switching center and the access point, wherein the second network path comprises at least one second intermediate router between the switching center and the access point, wherein the second network path is distinct from the first network path, and wherein the second data comprises second real-time latency information identifying a second real-time latency that exists on the second network path between the switching center and the access point. Next, step 3403 comprises repeatedly obtaining in a real-time manner, by the processing system, third data identifying a third network path between the switching center and the access point, wherein the third network path comprises at least one third intermediate router between the switching center and the access point, wherein the third network path is distinct from both the second network path and the first network path, and wherein the third data comprises third real-time latency information identifying a third real-time latency that exists on the third network path between the switching center and the access point; facilitating a first communication of a first plurality of packets from the switching center to the access point via the first network path. Next, step 3404 comprises responsive to the first real-time latency being equal to or greater than a first threshold: selecting as a selected network path either the second network path or the third network path, the selecting being based upon the second real-time latency and the third real-time latency, wherein the selecting is such that the selected network path is capable of carrying packets from the switching center to the access point in less time than the one of the second network path or the third network path that is not selected; and facilitating a second communication of a second plurality of packets from the switching center to the access point via the selected network path.

In one embodiment, there may be no intermediate node (that is, there may be just source and destination nodes in a path). In other embodiments there may be one or more intermediate nodes in a path.

While for purposes of simplicity of explanation, the respective processes are shown and described as a series of blocks in FIG. 2O, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide for "Relativistic Routing" in the context of an IP network (e.g., a fifth-generation (5G) wireless network, a sixth-generation (6G) wireless network, a subsequent generation wireless network, or any combination thereof).

As described herein, various embodiments can provide for routing packets in a 5G/6G mobility network based on lowest latency (thus dramatically improving the capacity of the mobility network to deliver emerging services in the 5G/6G network). Instead of using a single shortest path to a destination (such as has been done in certain conventional routing mechanisms), the Relativistic Routing Protocol (according to various embodiments) uses a multiplicity of paths (e.g., of varying latency) in parallel, to deliver traffic to a single destination. In various examples the RRP always uses the lowest latency path for a particular packet, but if that path gets congested (and therefore has increasing latency), the RRP can choose what may be a longer path (but with less congestion) for subsequent packets.

As described herein, certain conventional protocols may always choose the shortest path (however that is defined), wherein such shortest path of these conventional protocols is static and is manually configured. In contrast, various embodiments can provide a mechanism that uses dynamic values and that optimizes traffic with immediate updates that indicate the current state of the network in latency.

As described herein, various embodiments can provide for improved end user experience in connection with 5G/6G emerging services (which can demand lower latency network performance).

As described herein, various embodiments can operate in the context of a low-latency application (e.g., remote surgery, autonomous vehicles and drones, better VR remote presence, etc.).

As described herein, various embodiments can be implemented in the context of any entity that owns and/or manages one or more IP networks.

As described herein, various embodiments can provide for routing voice and data packets in 5G/6G mobility network based on lowest latency to dramatically improve the capacity of the backbone network to carry traffic.

Reference will now be made to description of a suitable router for use in connection with RRP according to various embodiments. Such router can have the following criteria: (a) build with white box, off the shelf hardware; (b) no FPGAs; (c) no ASICs; (d) provide maximum 1 ms delay across 3 nodes linearly spaced up to 5 miles apart to effectively compete against point-to-point fiber solution; (e) support generalized network configurations: linear, ring, mesh, star, etc.; (f) add nothing non-standard to an IP packet; (g) maintain no state of connections for scalability; (h) maintain complete compatibility (other than new routing protocol) with existing IP networks; (i) no centralized clock; (j) entirely asynchronous; (k) any combination thereof.

Reference will now be made to certain advantages (of various embodiments) over point-to-point fiber: (a) substantially lower overall cost; (b) more redundancy and better handling of failures with instantaneous rerouting; (c) lower delay for routes that do not have to travel through switching center, depending on path traveled; (d) less trenching and reduced ROW requirement with less fiber to install; (e) reduced RE required at switching center with much fewer terminations required (~25-50× fewer); (f) any combination thereof.

Reference will now be made to certain benefits of various embodiments: (a) viable alternative to point-to-point fiber at much lower total cost; (b) quick handling of link congestion and failures, reducing packet loss and outage time to provide better service to customers; (c) better network utilization—better return on investment in network capacity; (d) compatible with existing IP networks—can be incrementally deployed for incremental benefits; (e) versatile in configurations, from small to very large with white box hardware.

Reference will now be made to certain implementation details of various embodiments: (a) use of parallel processing hardware; (b) use of CPUs with up to 64 per chip, and 4 or more per motherboard; (c) use of GPUs; (d) use in the context of access technologies that deliver low latency (e.g., 5G and FTTP); (e) use of artificial intelligence (AI) to manage a complex, distributed system (in one specific example, AI can be processed by GPUs).

As described herein, various embodiments can provide a routing protocol that minimizes delay (minimizes transit time).

As described herein, various embodiments can provide for relativistic routing (which can be relativistic in the sense that events happen so rapidly that the speed of light is a very important factor in how it works).

As described herein, various embodiments can provide for the lowest possible latency in delivering packets (wherein, by providing the lowest latency, congestion can be avoided). In one example, the links in the network can be efficiently utilized. For instance, if one link gets congested, the communications can be switched to the next best route (another route may be selected even though it has more hops, as long as the selected route provides lower latency). This is akin to, for example, GOOGLE MAPS, which may send a traveler on a physically longer path which nevertheless takes less time because the longer path has less traffic.

As described herein, various embodiments can utilize the network such that when there are, for example, 20 paths between node A and node B, traffic is sent on all 20 paths at the same time. In one specific example, automatic load sharing can be implemented. In one example, as each path gets congested (and latency increases), some traffic can be re-directed in a cascading manner to the next lower-latency path (operation of such embodiments can be in contrast to certain conventional essentially static OSPF operations, which typically utilize only one path in a network for given traffic).

As described herein, various embodiments can provide one or more of the following: (a) better service—lower delay, thereby improving interactive and other delay-sensitive applications; (b) better service—lower packet loss, thereby improving all services on 5G/6G network; (c) reduced capital spending; (d) more efficient routing of traffic to a single destination on multiple paths (but, for example, always using the lowest instantaneous delay path for each packet).

As described herein, in various embodiments times (e.g., latency times) can be measured in microseconds.

Figure 3:
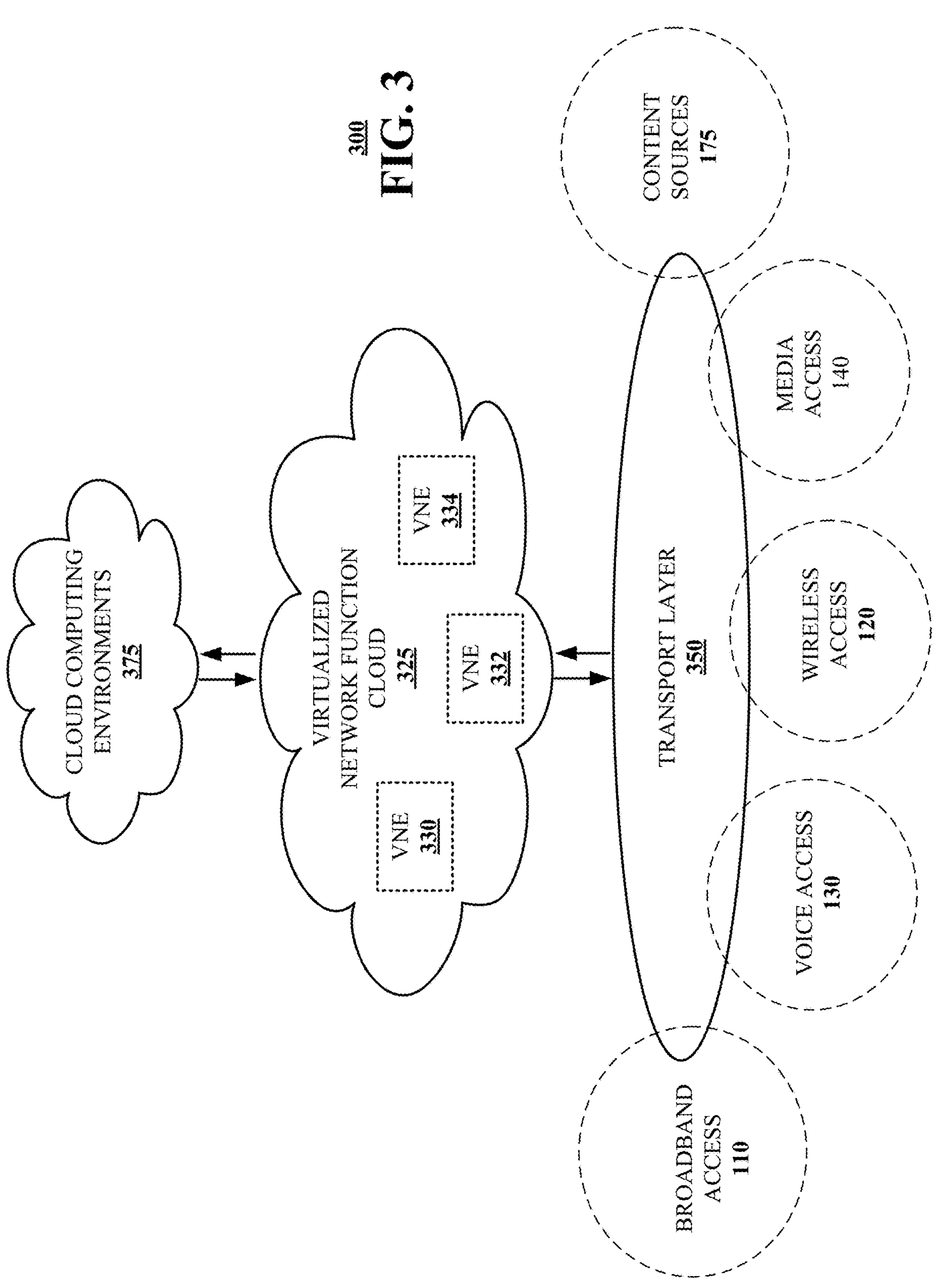
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of systems 100, 2100, 2200, 2300, 2400, 2500, 2600, 2700, 2800, 2900, 3000, 3100, and/or some or all of the functions of methods 3200, 3300, 3400. For example, virtualized communication network 300 can facilitate in whole or in part determining and utilizing one or more paths in a mobile network based upon current latencies (wherein, for example, the routing is based upon instantaneous latencies and results in a lowest latency non-shortest path routing).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
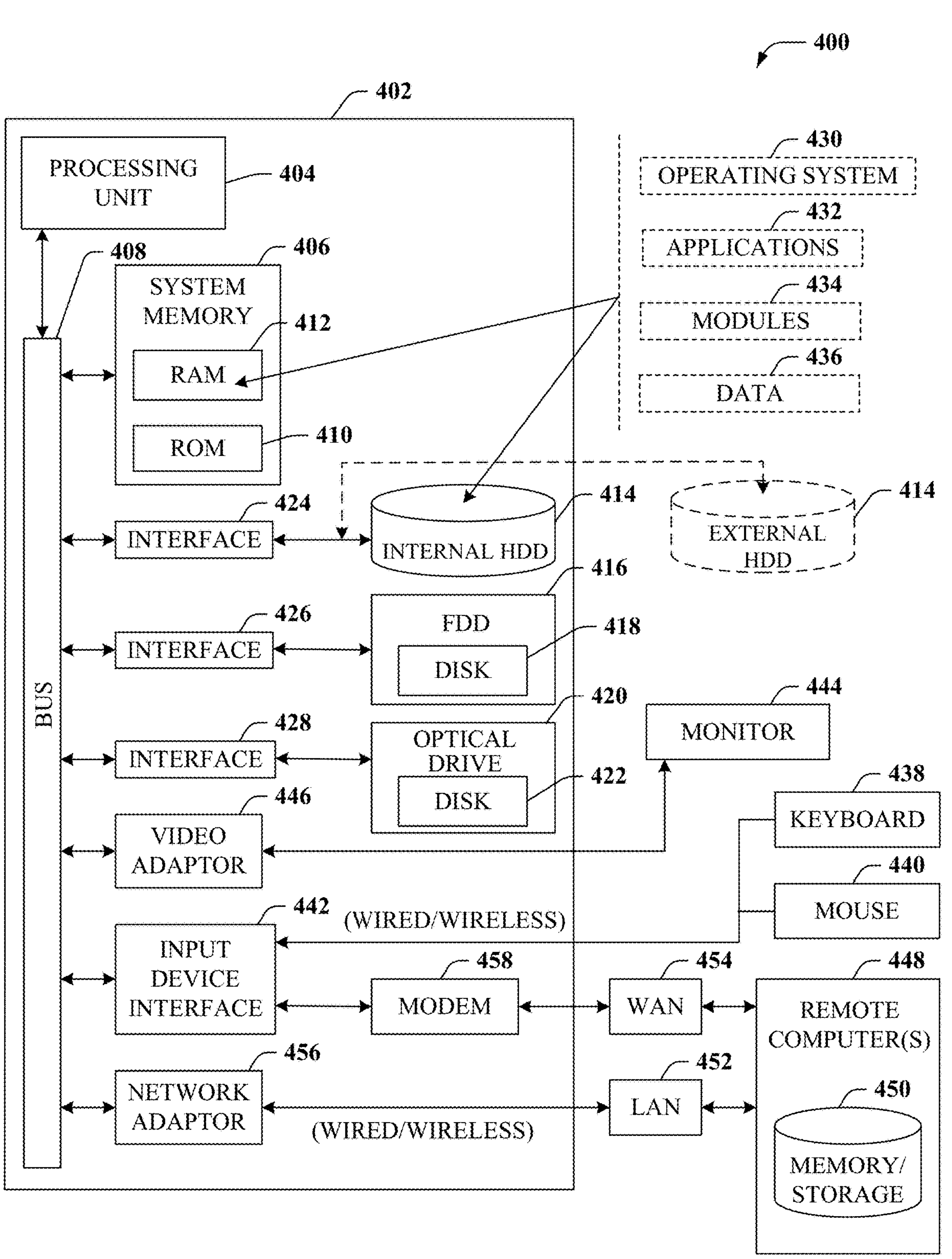
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining and utilizing one or more paths in a mobile network based upon current latencies (wherein, for example, the routing is based upon instantaneous latencies and results in a lowest latency non-shortest path routing).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
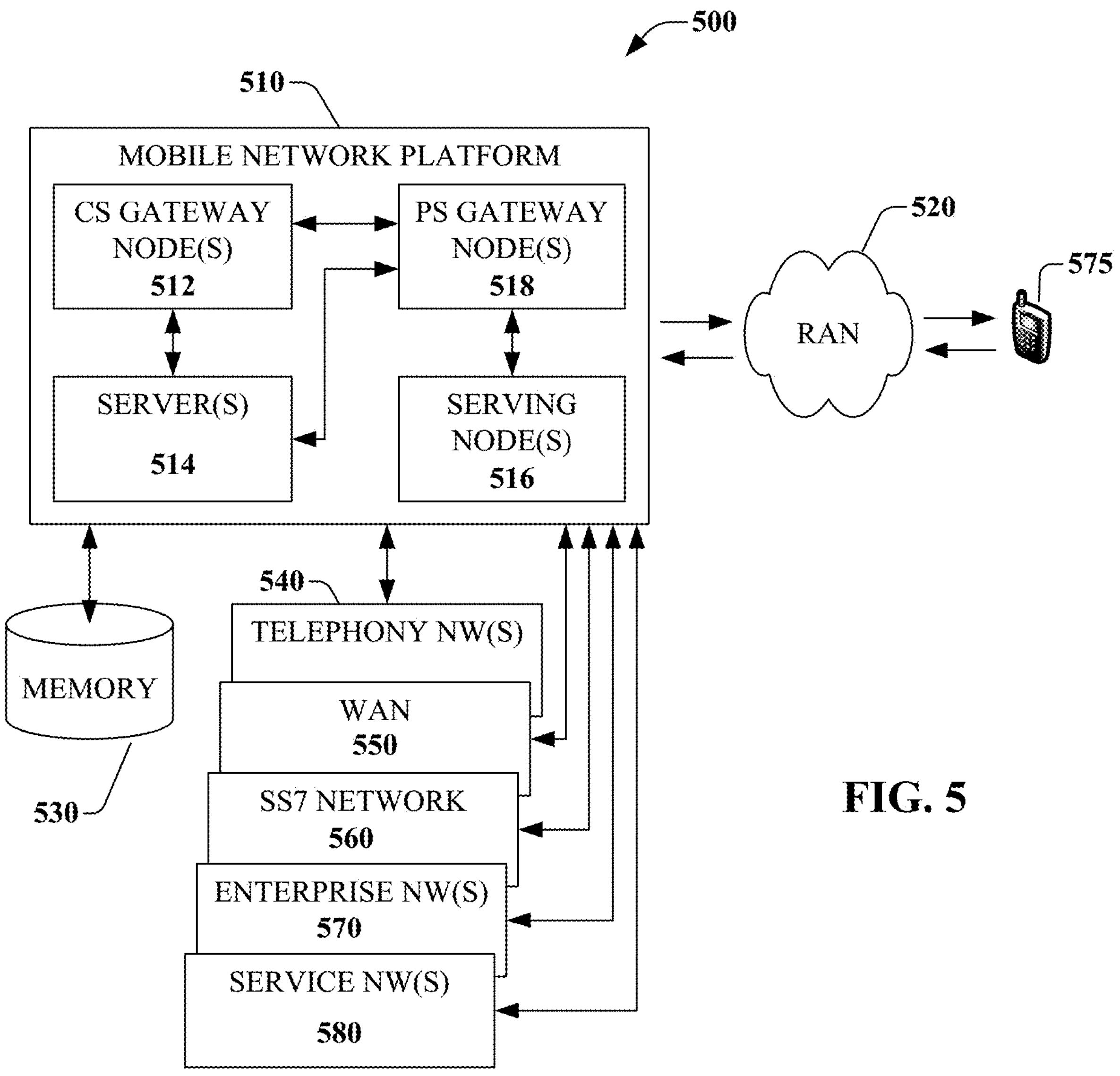
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining and utilizing one or more paths in a mobile network based upon current latencies (wherein, for example, the routing is based upon instantaneous latencies and results in a lowest latency non-shortest path routing). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
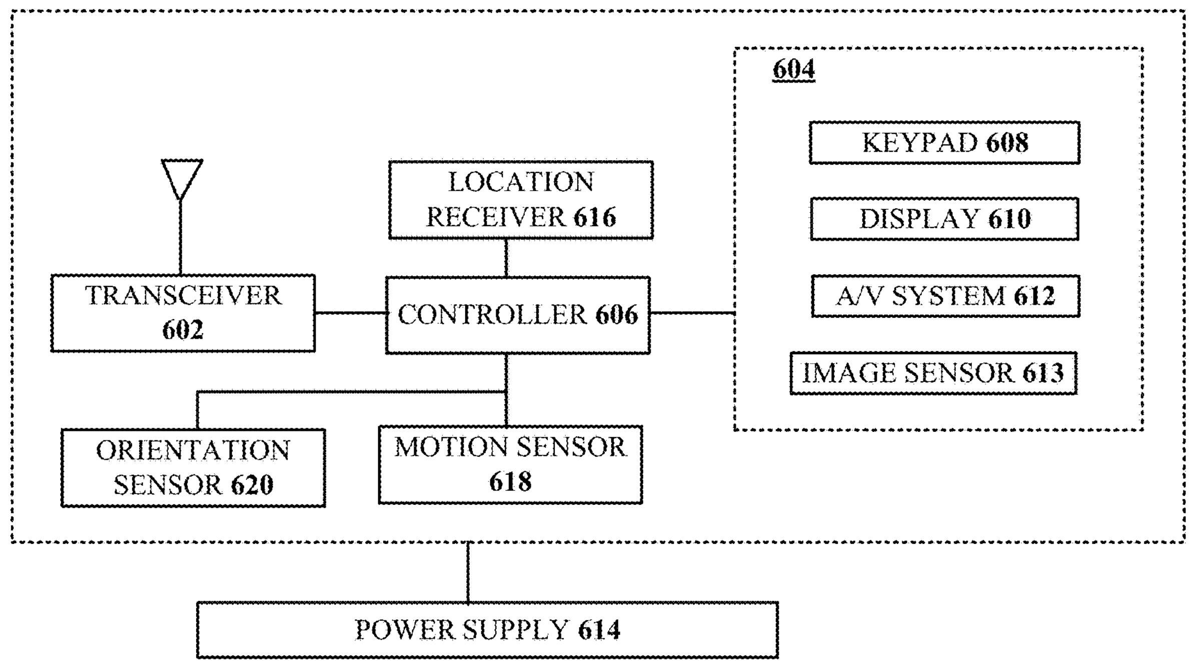
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining and utilizing one or more paths in a mobile network based upon current latencies (wherein, for example, the routing is based upon instantaneous latencies and results in a lowest latency non-shortest path routing).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically determining and utilizing path routing in a mobile network) can employ various AI-based schemes for carrying out various embodiments thereof. Moreover, the classifier can be employed to determine a ranking or priority of each network node, router, access point, base station, and/or network path. A classifier is a function that maps an input attribute vector, $x=(x_1, x_2, x_3, x_4 \ldots x_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the network node(s), router(s), access point(s), base station(s), and/or network path(s) is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, cause the processing system to perform operations, the operations comprising:

obtaining first information identifying a first path between a source node located in a network and a destination node located in the network, wherein the first path comprises a first plurality of nodes including at least one first intermediate node between the source node and the destination node, and wherein the first information comprises first latency information that identifies a first travel latency that exists on the first path between the source node and the destination node;

obtaining second information identifying a second path between the source node and the destination node, wherein the second path comprises a second plurality of nodes including at least the source node and the destination node, wherein the second path is not the same as the first path, and wherein the second information comprises second latency information that identifies a second travel latency that exists on the second path between the source node and the destination node;

obtaining queue depth information for an output queue that is associated with a next hop of at least one of the first path or the second path;

responsive to the queue depth information indicating that the output queue has reached a threshold, transmitting a route update packet comprising updated latency information to a plurality of other routers of the network;

and selecting as a selected path either the first path or the second path, the selecting being based upon the first travel latency and the second travel latency, wherein the selecting is such that the selected path is capable of carrying a packet from the source node to the destination node in less time than the one of the first path or the second path that is not selected.

2. The device of claim 1, wherein the operations further comprise facilitating transmission of traffic between the source node and the destination node, the transmission of the traffic comprising sending at least a first portion of the traffic via the selected path.

3. The device of claim 2, wherein the transmission of the traffic further comprises sending at least a second portion of the traffic via the one of the first path or the second path that is not selected.

4. The device of claim 2, wherein the transmission of the traffic comprises sending all of the traffic via the selected path.

5. The device of claim 1, wherein the selecting is carried out in real-time and takes into account a first amount of congestion on the first path and a second amount of congestion on the second path.

6. The device of claim 1, wherein:
the source node is at a switching center, the source node is part of a switching center, or any combination thereof; and
the destination node is at a wireless access point, the destination node is part of a wireless access point, or any combination thereof.

7. The device of claim 1, wherein:
the destination node comprises a wireless access point that is configured for communication with one or more mobile communication devices; and
each of the one or more mobile communication devices comprises a cell phone, a smartphone, a tablet computer, a laptop computer, or any combination thereof.

8. The device of claim 7, wherein the wireless access point comprises a base station.

9. The device of claim 1, wherein:
the first latency information further identifies a first queueing latency that exists on the first path between the source node and the destination node;
the second latency information further identifies a second queueing latency that exists on the second path between the source node and the destination node; and
the selecting is further based upon the first queueing latency and the second queueing latency.

10. The device of claim 9, wherein:
a first total latency comprises the first travel latency plus the first queueing latency;
a second total latency comprises the second travel latency plus the second queueing latency;
the selecting is such that in a first case that the first total latency is less than the second total latency, the first path is the selected path; and
the selecting is such that in a second case that the second total latency is less than the first total latency, the second path is the selected path.

11. The device of claim 1, wherein:
the first latency information further identifies a first processing latency that exists on the first path between the source node and the destination node;
the second latency information further identifies a second processing latency that exists on the second path between the source node and the destination node; and
the selecting is further based upon the first processing latency and the second processing latency.

12. The device of claim 11, wherein:
a first total latency comprises the first travel latency plus the first processing latency;
a second total latency comprises the second travel latency plus the second processing latency;
the selecting is such that in a first case that the first total latency is less than the second total latency, the first path is the selected path; and
the selecting is such that in a second case that the second total latency is less than the first total latency, the second path is the selected path.

13. The device of claim 1, wherein:
the network comprises an Internet Protocol (IP) network;
the source node is connected by one or more respective IP links to the first intermediate node;
the source node is connected by one or more respective IP links to a second intermediate node between the source node and the destination node;
the destination node is connected by one or more respective IP links to the first intermediate node; and
the destination node is connected by one or more respective IP links to the second intermediate node.

14. The device of claim 1, wherein:
the network comprises an Internet Protocol (IP) network;
the first intermediate node comprises a first plurality of intermediate nodes;
a second intermediate node between the source node and the destination node comprises a second plurality of intermediate nodes;
each of the first intermediate nodes is connected by a first respective IP link; and
each of the second intermediate nodes is connected by a second respective IP link.

15. The device of claim 1, wherein the route update packet includes a first value representing an actual delay on a path of the network and a second value representing a weighted delay on the path of the network, wherein the weighted delay is based on the queue depth information.

16. A non-transitory machine-readable medium comprising executable instructions that, when executed by a processing system including a processor, facilitate performance of operations, the operations comprising:
obtaining first data identifying a first path between a source node of a network and a destination node of the network, wherein the first path comprises at least one first intermediate router between the source node and the destination node, and wherein the first data comprises first latency information identifying a first latency that exists on the first path between the source node and the destination node;
obtaining second data identifying a second path between the source node and the destination node, wherein the second path comprises at least one second intermediate router between the source node and the destination node, wherein the second path is not the same as the first path, and wherein the second data comprises second latency information identifying a second latency that exists on the second path between the source node and the destination node;
obtaining third data identifying a third path between the source node and the destination node, wherein the third path comprises at least one third intermediate router between the source node and the destination node, wherein the third path is not the same as the first path or the second path, and wherein the third data comprises third latency information identifying a third latency that exists on the third path between the source node and the destination node;
facilitating a first transmission of one or more first packets from the source node to the destination node via the first path; and
responsive to the first latency meeting a first threshold:
selecting as a selected path either the second path or the third path, the selecting being based upon the second latency and the third latency, wherein the
selecting is such that the selected path is capable of carrying packets from the source node to the destination node in less time than the one of the second path or the third path that is not selected; and
facilitating a second transmission of one or more second packets from the source node to the destination node via the selected path;

obtaining queue depth information for an output queue of a router along the first path, wherein the output queue is associated with a next hop of the first path; and responsive to the queue depth information indicating that the output queue has reached a queue depth threshold, transmitting a route update comprising updated latency information to a plurality of other routers of the network.

17. The non-transitory machine-readable medium of claim 16, wherein:

the first latency meeting the first threshold comprises the first latency being equal to or greater than the first threshold; and responsive to the latency of the selected path meeting a second threshold:

selecting as another selected path the one of the second path and the third path that is not the selected path; and facilitating a third transmission of one or more third packets from the source node to the destination node via the another selected path.

18. The non-transitory machine-readable medium of claim 17, wherein:

the latency of the selected path meeting a second threshold comprises the latency of the selected path being equal to or greater than the second threshold;

the first threshold and the second threshold are equal;

the source node comprises a first router;

the destination node comprises a second router; and the network is a fifth-generation (5G) wireless network, a sixth-generation (6G) wireless network, a subsequent generation wireless network, or any combination thereof.

19. A method comprising:

obtaining, by a first router, first information identifying a first path between a source node located in a network and a destination node located in the network, wherein the first path comprises a first plurality of nodes including at least one first intermediate node between the source node and the destination node, and wherein the first information comprises first latency information that identifies a first travel latency that exists on the first path between the source node and the destination node;

obtaining, by the first router, second information identifying a second path between the source node and the destination node, wherein the second path comprises a second plurality of nodes including at least the source node and the destination node, wherein the second path is not the same as the first path, and wherein the second information comprises second latency information that identifies a second travel latency that exists on the second path between the source node and the destination node; and selecting, by the first router, as a selected path either the first path or the second path, the selecting being based upon the first travel latency and the second travel latency, wherein the selecting is such that the selected path is capable of carrying a packet from the source node to the destination node in less time than the one of the first path or the second path that is not selected;

obtaining, by the first router from a second router, a delay update comprising updated latency information;

responsive to an authority value associated with the updated latency information exceeding a stored authority value at the first router, updating, by the first router, a route table according to the updated latency information.

20. The method of claim 19, wherein:

the first latency information further identifies a first queueing latency that exists on the first path between the source node and the destination node;

the second latency information further identifies a second queueing latency that exists on the second path between the source node and the destination node; and the selecting is further based upon the first queueing latency and the second queueing latency.

* * * * *